US006760509B2

(12) United States Patent
Islam

(10) Patent No.: US 6,760,509 B2
(45) Date of Patent: Jul. 6, 2004

(54) SNR BOOSTER FOR WDM SYSTEMS

(75) Inventor: Mohammed N. Islam, Allen, TX (US)

(73) Assignee: The Regents of the University of Michigan, Ann Arbor, MI (US)

( * ) Notice: Subject to any disclaimer, the term of this patent is extended or adjusted under 35 U.S.C. 154(b) by 420 days.

(21) Appl. No.: 09/784,649

(22) Filed: Feb. 14, 2001

(65) Prior Publication Data

US 2004/0091204 A1 May 13, 2004

Related U.S. Application Data

(60) Provisional application No. 60/182,329, filed on Feb. 14, 2000.

(51) Int. Cl.[7] .................................................. G02B 6/26
(52) U.S. Cl. ............................ 385/24; 385/27; 385/122
(58) Field of Search ............................ 385/24, 123, 27, 385/122; 372/6, 94; 356/360, 361

(56) References Cited

U.S. PATENT DOCUMENTS

| | | | |
|---|---|---|---|
| 4,063,106 A | 12/1977 | Ashkin et al. .............. | 307/88.3 |
| 4,685,107 A | 8/1987 | Kafka et al. .................... | 372/6 |
| 4,740,974 A | 4/1988 | Byron ............................ | 372/3 |
| 4,831,616 A | 5/1989 | Huber ........................... | 370/3 |
| 5,039,199 A | 8/1991 | Mollenauer et al. ........ | 359/334 |
| 5,050,183 A | 9/1991 | Duling, III .................... | 372/94 |
| 5,058,974 A | 10/1991 | Mollenauer ................... | 385/27 |
| 5,107,360 A | 4/1992 | Huber ........................ | 359/124 |
| 5,117,196 A | 5/1992 | Epworth et al. ............. | 359/333 |
| 5,132,976 A | 7/1992 | Chung et al. .................. | 372/6 |
| 5,134,620 A | 7/1992 | Huber ........................... | 372/6 |
| 5,140,456 A | 8/1992 | Huber ........................ | 359/341 |
| 5,151,908 A | 9/1992 | Huber ........................... | 372/6 |

(List continued on next page.)

FOREIGN PATENT DOCUMENTS

| | | | |
|---|---|---|---|
| EP | 0 903 876 A1 | 3/1999 | ........... H04B/10/17 |
| EP | 0 936 761 A1 | 8/1999 | ........... H04B/10/18 |
| WO | WO 98/20587 | 5/1998 | ............. H01S/3/30 |

OTHER PUBLICATIONS

M.E. Fermann et al. Nonlinear amplifying loop mirror. Optics Letters, vol. 15 No. 13, pp. 752–754, Jul. 1990.*
M. Matsumoto et al. Dispersion–imbalanced nonlinear optical loop mirror with lumped dispersive elements. Electronics Letters, vol. 34 No. 11, pp. 1140–1142, May 1998.*
K. R. Tamura et al. Spectral–smoothing and pedestal reduction of wavelength tunable quasi–adiabatically compressed femtosecond solitons using a dispersion–flattened dispersion–imbalanced loop mirror. Phot. Tech. Lett. vol. 11 No. 2, pp. 230–232, Feb. 1999.*
Y.J. Chai et al. Nonlinear suppression of incoherent interferometric crosstalk using dispersion–imbalanced loop mirror. Electronics Letters, vol. 36 No. 18, pp. 1565–1566, Aug. 2000.*

(List continued on next page.)

*Primary Examiner*—John D. Lee
*Assistant Examiner*—Mike Stahl
(74) *Attorney, Agent, or Firm*—Baker Botts L.L.P.

(57) ABSTRACT

A non-linear optical loop mirror for processing optical signals comprises an optical fiber, a bi-directional amplifier, and a coupler. The optical fiber has a signal input and a signal output. At least a portion of the optical fiber includes a dispersion compensating fiber. At least a portion of the optical fiber forms a loop. The dispersion compensating fiber has an absolute magnitude of dispersion of at least 20 ps/nm-km for at least a portion of wavelengths in the optical signals. The bi-directional amplifier is coupled to the optical fiber. The coupler is coupled to a first portion of the optical fiber and a second portion of the optical fiber to form a fiber loop.

221 Claims, 22 Drawing Sheets

U.S. PATENT DOCUMENTS

| | | | |
|---|---|---|---|
| 5,153,762 A | 10/1992 | Huber | 359/125 |
| 5,159,601 A | 10/1992 | Huber | 372/6 |
| 5,166,821 A | 11/1992 | Huber | 359/238 |
| 5,187,760 A | 2/1993 | Huber | 385/37 |
| 5,191,586 A | 3/1993 | Huber | 372/6 |
| 5,191,628 A | 3/1993 | Byron | 385/27 |
| 5,200,964 A | 4/1993 | Huber | 372/26 |
| 5,208,819 A | 5/1993 | Huber | 372/32 |
| 5,210,631 A | 5/1993 | Huber et al. | 359/132 |
| 5,212,579 A | 5/1993 | Huber et al. | 359/182 |
| 5,218,655 A | 6/1993 | Mizrahi | 385/39 |
| 5,222,089 A | 6/1993 | Huber | 372/6 |
| 5,225,925 A | 7/1993 | Grubb et al. | 359/341 |
| 5,226,049 A | 7/1993 | Grubb | 372/6 |
| 5,243,609 A | 9/1993 | Huber | 372/9 |
| 5,257,124 A | 10/1993 | Glaab et al. | 359/124 |
| 5,268,910 A | 12/1993 | Huber | 372/6 |
| 5,271,024 A | 12/1993 | Huber | 372/6 |
| 5,283,686 A | 2/1994 | Huber | 359/337 |
| 5,293,545 A | 3/1994 | Huber | 359/111 |
| 5,295,016 A | 3/1994 | Van Deventer | 359/347 |
| 5,295,209 A | 3/1994 | Huber | 385/37 |
| 5,301,054 A | 4/1994 | Huber et al. | 359/132 |
| 5,321,543 A | 6/1994 | Huber | 359/187 |
| 5,321,707 A | 6/1994 | Huber | 372/6 |
| 5,323,404 A | 6/1994 | Grubb | 372/6 |
| 5,331,449 A | 7/1994 | Huber et al. | 359/125 |
| 5,359,612 A | 10/1994 | Dennis et al. | 372/18 |
| 5,373,389 A | 12/1994 | Huber | 359/195 |
| 5,389,779 A | 2/1995 | Betzig et al. | 250/216 |
| 5,400,166 A | 3/1995 | Huber | 359/173 |
| 5,416,629 A | 5/1995 | Huber | 359/182 |
| 5,450,427 A | 9/1995 | Fermann et al. | 372/18 |
| 5,467,212 A | 11/1995 | Huber | 359/168 |
| 5,473,622 A | 12/1995 | Grubb | 372/6 |
| 5,477,555 A | 12/1995 | Debeau et al. | 372/25 |
| 5,479,291 A | 12/1995 | Smith et al. | 359/333 |
| 5,485,481 A | 1/1996 | Ventrudo et al. | 372/6 |
| 5,497,386 A | 3/1996 | Fontana | 372/18 |
| 5,504,609 A | 4/1996 | Alexander et al. | 359/125 |
| 5,504,771 A | 4/1996 | Vahala et al. | 372/94 |
| 5,513,194 A | 4/1996 | Tamura et al. | 372/6 |
| 5,521,738 A | 5/1996 | Froberg | 359/184 |
| 5,530,710 A | 6/1996 | Grubb | 372/6 |
| 5,532,864 A | 7/1996 | Alexander et al. | 359/177 |
| 5,541,947 A | 7/1996 | Mourou et al. | 372/25 |
| 5,542,011 A | 7/1996 | Robinson | 385/24 |
| 5,555,118 A | 9/1996 | Huber | 359/125 |
| 5,557,442 A | 9/1996 | Huber | 359/179 |
| 5,577,057 A | 11/1996 | Frisken | 372/18 |
| 5,579,143 A | 11/1996 | Huber | 359/130 |
| 5,600,473 A | 2/1997 | Huber | 359/179 |
| 5,617,434 A | 4/1997 | Tamura et al. | 372/6 |
| 5,623,508 A | 4/1997 | Grubb et al. | 372/3 |
| 5,625,727 A * | 4/1997 | Liedenbaum et al. | 385/16 |
| 5,646,759 A * | 7/1997 | Lichtman et al. | 398/101 |
| 5,655,039 A * | 8/1997 | Evans | 385/27 |
| 5,659,351 A | 8/1997 | Huber | 348/7 |
| 5,659,559 A | 8/1997 | Ventrudo et al. | 372/6 |
| 5,659,644 A | 8/1997 | DiGiovanni et al. | 385/31 |
| 5,673,280 A | 9/1997 | Grubb et al. | 372/3 |
| 5,673,281 A | 9/1997 | Byer | 372/3 |
| 5,701,186 A | 12/1997 | Huber | 359/125 |
| 5,726,784 A | 3/1998 | Alexander et al. | 359/125 |
| 5,734,665 A | 3/1998 | Jeon et al. | 372/6 |
| 5,757,541 A | 5/1998 | Fidric | 359/341 |
| 5,768,012 A | 6/1998 | Zanoni et al. | 359/341 |
| 5,798,855 A | 8/1998 | Alexander et al. | 359/177 |
| 5,825,520 A | 10/1998 | Huber | 359/130 |
| 5,838,700 A | 11/1998 | Dianov et al. | 372/6 |
| 5,841,797 A | 11/1998 | Ventrudo et al. | 372/6 |
| 5,847,862 A | 12/1998 | Chraplyvy et al. | 359/337 |
| 5,861,981 A | 1/1999 | Jabr | 359/341 |
| 5,880,866 A | 3/1999 | Stolen | 359/138 |
| 5,883,736 A | 3/1999 | Oshima et al. | 359/341 |
| 5,887,093 A | 3/1999 | Hansen et al. | 385/27 |
| 5,920,423 A | 7/1999 | Grubb et al. | 359/341 |
| 6,377,391 B1 * | 4/2002 | Vakoc et al. | 359/337.1 |
| 6,424,773 B1 * | 7/2002 | Watanabe | 385/122 |
| 6,587,606 B1 * | 7/2003 | Evans | 385/15 |
| 2003/0012492 A1 * | 1/2003 | Tadakuma et al. | 385/27 |

OTHER PUBLICATIONS

N. Chi et al. All–optical wavelength conversion and multi-channel 2R regeneration based on highly nonlinear dispersion–imbalanced loop mirror. Photonic Technology Letters, vol. 14 No. 11, pp. 1581–1583, Nov. 2002.*

Sun, Y. et al., "80nm Ultra–Wideband Erbium–Doped Silicia Fibre Amplifier" Electronics Letters, Nov. 6, 1997, vol. 33, No. 23, pp. 1965–1967.

Wysocki, P.F. et al., "Broad–Band Erbium–Doped Fiber Amplifier Flattened Beyond 40nm Using Long–Period Grating Filter", IEEE Photonics, vol. 9, No. 10, Oct. 10, 1997, pp. 1343–1345.

Liaw, S–K et al., "Passive Gain–Equalized Wide–Band Erbium–Doped Fiber Amplifier Using Samarium–Doped Fiber", IEEE Photonics Technology: Letters, vol. 8, No. 7, Jul. 7, 1996, pp. 879–881.

Yamada, M. et al., "A Low–Noise and Gain–Flattened Amplifier Composed of a Silica–Based and a Fluoride–Based Er3+–Doped Fiber Amplifierin a Cascade Configuration", IEEE Photonics Letters, vol. 8, No. 5, May 1996, pp. 620–622.

Ma, M.X. et al., "240–km Repeater Spacing in a 5280–km WDM System Experiment Using 8×2.5 Gb/s NRZ Transmission", IEEE Photonics Technology Letters, vol. 10, No. 6, Jun. 1998, pp. 893–895.

Masuda, H. et al., "Ultrawide 75–nm 3–dB Gain–Band Optical Amplification with Erbium–Doped Fluoride Fiber Amplifiers and Distributed Raman Amplifiers", IEEE Photonics Technology Letters, vol. 10, No. 4, Apr. 1998, pp. 516–518.

Masuda, H. et al., "Wide–Band and Gain Flattened Hybrid Fiber Amplifier Consisting of an EDFA and a Multiwavelength Pumped Raman Amplifier", IEEE Photonics Technology Letters, vol. 11, No. 6, Jun. 1999, pp. 647–649.

Kawai, S. et al., "Ultra–Wide, 75nm 3dB Gain–Band Optical Amplifier Utilising Gain–Flattened Erbium–Doped Fluoride Fibre Amplifier and Discrete Raman Amplification", Electronic Letters, vol. 34, No. 9, Apr. 30, 1998, pp. 897–898.

Kawai, S. et al., "Ultrawide, 75nm 3dB Gain–Band Optical Amplifier Utilizing Erbium–Doped Fluoride Fiber and Raman Fiber", OFC Technical Digest, 1998 (month unknown).

Kidorf, H. et al., "Pump Interactions in a 100–nm Bandwidth Raman Amplifier", IEEE Photonics Technology Letters, vol. 11, No. 5, May 1999, pp. 530–532.

Ono, H. et al., "Gain–Flattened Er3+–Doped Fiber Amplifier for a WDM Signal in the 1.57–1.60–$\mu$m Wavelength Region", IEEE Photonics Technology Letters, vol. 9, No. 5, May 1997, pp. 596–598.

Hansen, P.B. et al., "529km Unrepeatered Transmission at 2.488 Gbit/s Using Dispersion Compensation, Forward Error Correction, and Remote Post–and Pre–amplifiers Pumped By Diode–Pumped Raman Lasers", IEEE Electronics Letters Online No. 19951043, Jul. 7, 1998.

Guy, M.J. et al., "Lossless Transmission of 2ps Pulses Over 45km of Standard Fibre at 1.3µm Using Distributed Raman Amplification", Electronics Letters, vol. 34, No. 8, Apr. 16, 1998, pp. 793–794.

Dianov, E.M. et al., "Highly Efficient 1.3µm Raman Fibre amplifier", Electronics Letters, vol. 34, No. 7, Apr. 2, 1998, pp. 669–670.

Chernikov, S.V. et al., "Raman Fibre Laser Operating at 1.24µm", Electronics Letters, vol. 34, No. 7, Apr. 2, 1998, pp. 680–681.

Masuda, M. et al., "Wideband, Gain–Flattened, Erbium––Doped Fibre Amplifiers with 3dB Bandwidths of >50nm", Electronics Letters, vol. 33, No. 12, Jun. 5, 1997, pp. 1070–1072.

Yang, F.S. et al., "Demonstration of Two–Pump Fibre Optical Parametric Amplification", Electronics Letters, vol. 33, No. 21, Oct. 9, 1997, pp. 1812–1813.

Kawai, S. et al., "Wide–Bandwidth and Long–Distance WDM Transmission Using Highly Gain–Flattened Hybrid Amplifier", IEEE Photonics Technology Letters, vol. 11, No. 7, Jul. 1999, pp. 886–888.

Paschotta, R. et al., "Ytterbium–Doped Fiber Amplifiers", IEEE Journal of Quantum Electronics, vol. 33, No. 7, Jul. 1997, pp. 1049–1056.

Grubb, S.G. et al., "Fiber Raman Lasers Emit at Many Wavelengths", Laser Focus World, Feb. 1996, pp. 127–134.

Mollenauer, L.F. et al., "Dispersion–Managed Solitons for Terrestrial Transmission", Optical Society of America, 1999 (month unknown).

Hanssen, S. L. et al., "Gain Limit in Erbium–Doped Fiber Amplifiers Due to Internal Rayleigh Backscattering", IEEE Photonics Technology Letters, vol. 4, No. 6, Jun. 1992, pp. 559–561.

Spirit, D.M. et al., "Systems Aspects of Raman Fibre Amplifiers", Optical Amplifiers for Communication, vol. 137, Pt. J, No. 4, Aug. 1990, pp. 221–224.

Mollenenauer, L.F. et al., "Soliton Propagation in Long Fibers with Periodically Compensated Loss", IEEE Journal of Quantum Electronics, vol. QE–22, No. 1, Jan. 1986, pp. 157–173.

Marhic, M.E. et al., "Cancellation of Stimulated–Raman–Scattering Cross Talk in Wavelength–Division–Multiplexed Optical Communication Systems by Series or Parallel Techniques", Optical Society of America, 1998, vol. 15, No. 3, pp. 958–963 (Mar.).

Hansen, P.B. et al., "Rayleigh Scattering Limitations in Distributed Raman Pre–Amplifiers", IEEE Photonics Technology Letters, vol. 10, No. 1, Jan. 1998, pp. 159–161.

Ikeda, M., "Stimulated Raman Amplification Characteristics in Long Span Single–Mode Silica Fibers", Optics Communications, vol. 39, No. 3, 1981, pp. 148–152 (Oct.).

A.R. Chraplyvy et al., "Performance Degradation Due to Stimulated Raman Scattering in Wavelength–Division–Multiplexed Optical–Fibre Systems", Electronics Letters, vol. 19, No. 6, Aug. 4, 1983, pp. 641–643.

Grandpierre, A.G. et al., "Theory of Stimulated Raman Scattering Cancellation in Wavelength–Division–Multiplexed Systems via Spectral Inversion", IEEE Photonics Technology Letters, vol. 11, No. 10, Oct. 1999, pp. 1271–1273.

Chinn, S.R. "Analysis of Counter–Pumped Small–Signal Fibre Raman Amplifiers", Electronics Letters, vol. 33, No. 7, Mar. 27, 1997, pp. 607–608.

Stolen, R.H. et al., "Raman Gain in Glass Optical Waveguides", Appl. Phys. Lett. vol. 22, No. 6, Mar. 15, 1973, pp. 276–278.

Stolen, R.H. et al., "Development of the Stimulated Raman Spectrum in Single–Mode Silica Fibers", Optical Society of America, vol. 1, No. 4, Aug. 1984, pp. 662–667.

Nissov, M. et al., "100 Gb/s (10×10Gb/s) WDM Transmission Over 7200 km Using Distributed Raman Amplification", ECOC '97 (month unknown), pp. 9–12.

Takachio, N. et al., "32×10 Gb/s Distributed Raman Amplification Transmission with 50–GHz Channel Spacing in the Zero–Dispersion Region over 640km of 1.55–µm Dispersion–shifted Fiber", OFC '99 month unknown.

* cited by examiner

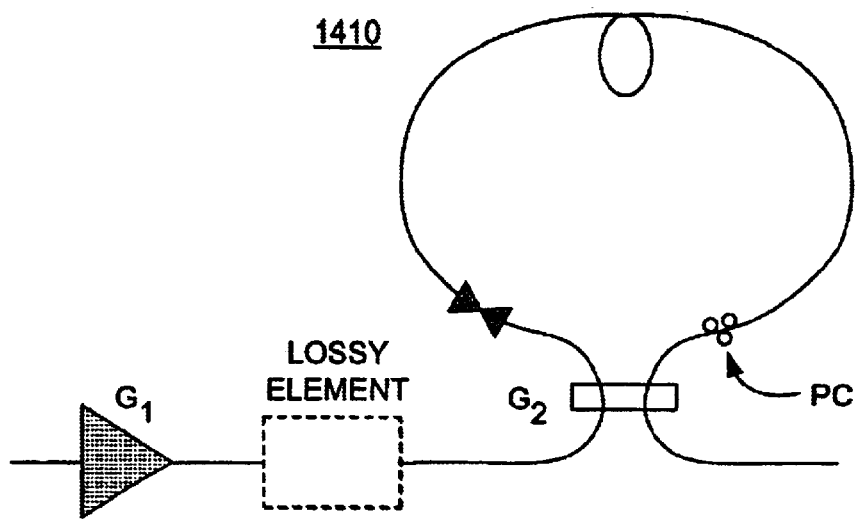
FIG. 14A
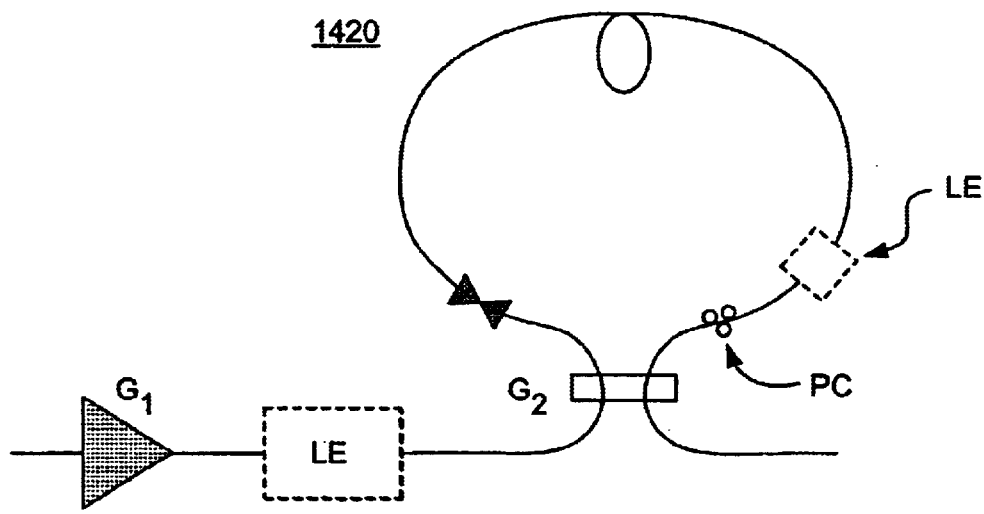
FIG. 14B
| $P_{in}$ (dBm) | $G_1$ (dB) | $G_2$ (dB) | $P_{out}$ (dBm) |
|---|---|---|---|
| -11 | 0 | 30 | 9.18 |
| -11 | 5 | 25 | 9.17 |
| -11 | 10 | 20 | 9.16 |
| -11 | 15 | 15 | 9.10 |
FIG. 14C

SNR BOOSTER FOR WDM SYSTEMS

CROSS REFERENCE TO RELATED APPLICATION

This application claims the benefit of priority from U.S. Application No. 60/182,329, filed Feb. 14, 2000, which application is fully incorporated herein by reference.

BACKGROUND OF THE INVENTION

1. Field of the Invention

The present invention relates to optical SNR boosters. More particularly, the present invention relates to nonlinear optical loop mirrors unbalanced by one or more nonlinearities.

2. Description of Related Art

As the number of wavelengths in wavelength-division multiplexed (WDM) systems increases, electronic regenerators can increasingly dominate the cost of transmission links. One electronic regenerator can be required per wavelength channel, and for N wavelengths the cost of the N regenerators can become prohibitive. N can presently approach 100 or larger. An electronic regenerator can be a so-called 3-R regenerator, restoring timing, pulse shape, and pulse amplitude. Optical amplifiers have been a key enabler for WDM networks because a single amplifier can simultaneously provide gain to a number of wavelength channels. By using an all-optical solution, the transmission line can be at least semi-transparent by avoiding optical-to-electronic and electronic-to-optical conversions.

A typical fiber-optic transmission line can have periodically-spaced optical amplifiers to compensate for the loss of the fiber. Each amplifier, however, can introduce noise, or amplified spontaneous emission, during the amplification process, which in turn can degrade the SNR. As the signal traverses more amplifiers, the SNR can decrease. In a telecommunication system, an electronic regenerator can be typically inserted every five amplifier spans, corresponding to about 400–600 km between regenerators (c.f. FIG. 1). The optical amplifier can be a 1-R device restoring signal amplitude, while the regenerator can boost the SNR and perform the 3-R functions. As the number of wavelengths increases and the cost of amplifiers decreases, the economics of the transmission links can be dominated by the regenerators. In addition, the physical size or footprint of these electronic regenerators in a central office begins to dominate the cost.

To increase the capacity of systems while reducing the cost, several upgrades can be being planned. First, the amplifier span can be increased. Second, the bit-rate per channel can be increased. Third, more channels of WDM at new wavelengths can be added. All three of these steps can lead to a degradation of the SNR. To permit these upgrades while reducing the need for electronic regeneration, the SNR can be periodically boosted. In WDM systems the SNR booster can be used with multiple wavelength channels without increasing cost or complexity along with the number of channels.

The 3R functionality can be difficult to achieve all-optically for multiple wavelengths. Restoration of amplitude can be achieved using an amplifier, and reshaping can be done using pulse reshaping in solitons. Re-timing can be difficult to accomplish except on a channel-by-channel basis such as with an electronic regenerator. For operation at multiple wavelengths, the timing between channels can vary since each wavelength can have a different group velocity dispersion. Timing extraction or clock recovery for multiple wavelength channels can be done with physically separated channels. In all-optical solutions re-timing can be difficult with a fixed speed-of-light. Building an all-optical 3-R regenerator can be difficult.

One step toward an all-optical regenerator can be an all-optical signal-to-noise ratio (SNR) booster, or optical sweeper. Therefore, what is needed is an optical SNR booster that can simultaneously operate for multiple wavelength channels and/or can remove both in-band and out-of-band noise.

SUMMARY OF THE INVENTION

The all-optical SNR booster can remove in-band and out-of-band noise. The all-optical SNR booster can simultaneously operate for multiple wavelength channels. The SNR booster can permit an increase in the spacing between electronic regenerators, thereby reducing the cost of the system.

The optical sweeper can reduce the cost of systems and permit bandwidth upgrades. The optical sweeper can have applications in long-haul, metro and router networks, and can apply to new and legacy systems. The optical sweeper can reconfigure current optical amplifiers to simultaneously amplify, dispersion compensate, and boost the signal to noise ratio. One optical sweeper embodiment can be an all-fiber embodiment made from commercially available parts.

One embodiment of a non-linear optical loop mirror for processing optical signals can include an optical fiber, a bi-directional amplifier, and a coupler. The optical fiber can include a signal input and a signal output. At least a portion of the optical fiber can include a dispersion compensating fiber. At least a portion of the optical fiber can form a loop. The dispersion compensating fiber can have an absolute magnitude of dispersion of at least 20 ps/nm-km for at least a portion of wavelengths in the optical signals. The bi-directional amplifier can be coupled to the optical fiber. The coupler can be coupled to a first portion of the optical fiber and a second portion of the optical fiber to form a fiber loop.

One embodiment of a non-linear optical loop mirror for processing optical signals can include a first optical fiber, a second optical fiber, a bi-directional amplifier, and a coupler. The first optical fiber can include a signal input and a signal output. The second optical fiber can be coupled to the first optical fiber to form a fiber loop. At least a portion of the second optical fiber can include a dispersion compensating fiber that can have an absolute magnitude of dispersion of at least 20 ps/nm-km for at least a portion of wavelengths in the optical signals. The bi-directional amplifier can be coupled to at least one of the first and second optical fibers. The coupler can be coupled to the first and second optical fibers.

One embodiment of a method of processing optical signals can include providing a non-linear optical loop mirror that includes a dispersion compensating fiber and a fiber loop, the dispersion compensating fiber having an absolute magnitude of dispersion of at least 20 ps/nm-km for at least a portion of wavelengths in the optical signals; introducing the optical signal to the non-linear optical loop mirror; and simultaneously amplifying and dispersion compensating the optical signal in the non-linear optical loop mirror.

One embodiment of a non-linear optical loop mirror for processing optical signals can include an optical fiber, a bi-directional amplifier, and a coupler. The optical fiber can include a signal input, a signal output, and a fiber loop. At least a portion of the optical fiber can include a sufficiently large dispersion to minimize phase shift interactions between adjacent wavelength signals of the optical signals. At least a portion of the optical fiber can form a fiber loop. The bi-directional amplifier can be coupled to the optical fiber. The coupler can be coupled to the fiber loop.

One embodiment of an optical regeneration system can include a wavelength demultiplexer, a wavelength multiplexer, and a plurality of nonlinear optical loop mirrors. Each of the plurality of nonlinear optical loop mirrors can include a first fiber, a second fiber, a coupler, and a first optical amplifier. The first fiber can include a first end, a second end, and a first effective nonlinearity. The first effective nonlinearity can be determined at least by an index of refraction of the first fiber and an effective area of the first fiber. The second fiber can include a first end, a second end, and a second effective nonlinearity determined at least by an index of refraction of the second fiber and an effective area of the second fiber. The first effective nonlinearity can be distinct from the second effective nonlinearity. The coupler can be coupled to the first end of the first fiber, the first end of the second fiber, the wavelength demultiplexer, and the wavelength multiplexer. The first optical amplifier can be coupled to the second end of the first fiber and the second end of the second fiber. The first optical amplifier amplifies at least signals traveling in a first direction from the second end of the first fiber to the second end of the second fiber and signals traveling in a second direction from the second end of the second fiber to the second end of the first fiber.

One embodiment of an optical system for processing optical signal, can include an input optical fiber, a splitter, and at least a first loop mirror. The splitter can be coupled to the input optical fiber. The splitter separates adjacent channels of an input optical signal. At least a first loop mirror can be coupled to the splitter. At least a first loop mirror includes a fiber loop. At least a portion of the fiber loop includes a dispersion compensating fiber. At least a portion of the dispersion compensating fiber can have an absolute magnitude of dispersion of 20 ps/nm-km for a majority of wavelengths in the optical signals.

One embodiment of a non-linear optical loop mirror can include a first optical fiber, a second optical fiber, and a coupler. The first optical fiber can include a first effective non-linearity. The second optical fiber can be coupled to the first optical fiber and can form a fiber loop. The second optical fiber can include a second effective non-linearity that can be different from the first effective non-linearity. The coupler can be coupled to the first and second optical fibers. A length of the first optical fiber can be greater than a walk-off length for at least a portion of adjacent wavelengths propagating in the first fiber.

One embodiment of a non-linear optical loop mirror can include a first optical fiber, a second optical fiber, bi-directional amplifier, and a coupler. The first optical fiber can include a first effective non-linearity. The second optical fiber can be coupled to the first optical fiber and can form a fiber loop. The second optical fiber can include a second effective non-linearity that can be different from the first effective non-linearity. The bi-directional amplifier can be coupled to at least one of the first and second optical fibers. The coupler can be coupled to the first and second optical fibers.

BRIEF DESCRIPTION OF THE DRAWINGS

FIGS. 14(a)–(c) shows embodiments of a multi-stage amplifier/SNR booster.

DETAILED DESCRIPTION OF THE INVENTION

Figure 1:
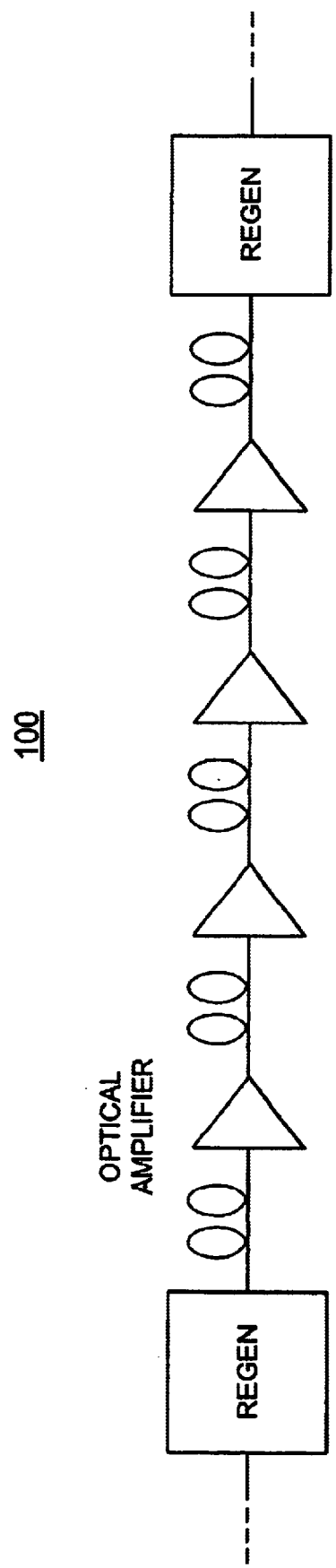
FIG. 1 is an embodiment of a configuration of amplifiers and regenerators in typical communications systems.

Nonlinearity-unbalanced optical loop mirrors include all-fiber embodiments that can satisfy most of the requirements for the SNR booster. A nonlinearity-unbalanced nonlinear optical loop mirror (NU-NOLM) can include two adjoining fibers with different effective nonlinearities to unbalance the interferometer and/or to provide intensity-dependent switching. A nonlinearity-unbalanced nonlinear amplifying loop mirror (NU-NALM) enhances the nonlinearity unbalance while reducing the required fiber length by placing a bi-directional optical amplifier in the loop mirror. One embodiment places the bi-directional optical amplifier near the mid-point of the loop mirror. The NU-NALM can operate on the basis of intensity differences and may not require a delicate balance between nonlinearity and dispersion. Fiber lengths shorter than a dispersive length can be used to minimize pulse shape distortions. Multi-wavelength operation for the NU-NOLM and/or the NU-NALM can be achieved by controlling the walk-off between channels by using dispersion.

Preliminary simulations can design one embodiment of an SNR booster, for example, for 10 Gb/s, 20 psec RZ pulses. The embodiment can use 1.85 km lengths of dispersion-compensating fiber and standard fiber, a 10 dB bi-directional erbium-doped fiber amplifier, and a 50:50 coupler at the base of the loop. The design can be all-fiber and can include commercially available elements. A peak transmitted power that can be 9× the input can be obtained at an input average power of 16 mW, which can be within a factor of 4 of the power levels used in OC-192 transmission systems. There may be no pulse break-up, and observed pulse broadening can be recompressed using pre-chirping, dispersion compensation, and/or propagation in the transmission line. The embodiment can work for multi-wavelength channels without cross-talk, such as when the channel spacing can be, for example, 3 nm or larger. Transmission systems with 100 GHz channel spacing can require four such embodiments to achieve SNR boosting for all channels. Transmission systems with 50 GHz channel spacing can require eight such embodiments to achieve SNR boosting for all channels.

An all-optical SNR booster or regenerator can be designed for a variety of signal channels. Signals can be of the return-to-zero (RZ), or soliton format. The embodiment can be surrounded by NRZ-to-RZ and RZ-to-NRZ converters. The WDM system can include, for example, equally spaced channels, which can be due to filtering technologies such as Fabry-Perot based embodiments, Mach-Zehnder interferometer based embodiments, and/oror waveguide grating routers. Group-velocity dispersion can be such that adjacent WDM channels can have the closest velocity to one another. Such dispersion can have a roughly linear slope with wavelength, which can be true of many standard and dispersion-shifted fibers. Therefore, when concerned about interaction or cross-talk between channels, the nearest neighbor wavelength channels can be the channels of concern.

A regenerative embodiment that simultaneously can boost the SNR for a number of wavelength channels, can perform one or more of the following: boost SNR by rejecting the low-level noise and transmitting the higher level signals; operate simultaneously for multiple wavelengths without cross-talk between channels; work independently of the input state of polarization; operate over a wide frequency range (i.e., broadband); not require timing recovery or a beam other than the multi-wavelength signal input; not require O/E and E/O conversions; function at power levels close to the signal levels in the transmission line or after optical amplification of the signal; have relatively low insertion loss and high through-put; not cause a large distortion of the signal (i.e., introduce low dispersion); be an all-fiber construction and include commercially available components and fibers; and/or include specialty fibers enhancing performance.

The SNR booster can compensate for one or more sources or types of noise. "Out-of-band noise" can be noise outside the wavelength band of the signal. For example, the amplified spontaneous emission from an optical amplifier can be much more broadband than the signal channel bandwidth. One way of removing out-of-band noise can be with a frequency filter. The frequency filter may not introduce too much additional loss in the signal bandwidth. "In-band noise" can be noise that overlaps the wavelength band of the signal. The in-band noise can be deleterious for fiber transmission, and can be difficult to remove. This noise source can be easier to distinguish in the time domain. The RZ signals can occupy certain time slots while the in-band noise can be continuous wave. With an intensity discriminator and/or a fast saturable absorber, out-of-band noise and/or in-band noise not temporally overlapped with the signal can be removed. Intensity-dependent switching can boost the SNR with respect to out-of-band and in-band noise sources.

One embodiment that can operate as a SNR booster is a nonlinearity-unbalanced nonlinear optical loop mirror (NU-NOLM). A NOLM can be a nonlinear Sagnac interferometer comprising a coupler, with two ports of the coupler coupled by a length of fiber. The two arms of the NOLM interferometer can correspond to clockwise and counter-clockwise propagation directions around the loop. While the interferometer is balanced (i.e., both directions have identical propagation characteristics), input to the NOLM can be reflected. When unbalanced, the NOLM can have a transmission function that depends on the intensity of light. The NOLM can serve as an ultrafast saturable absorber, which can be the functionality desired for a SNR booster.

A number of important parameters for the NOLM include switching energy, fiber length, fiber dispersion, attenuation, and coupler specifications.

The NOLM can be unbalanced to make a fast saturable absorber. A directional coupler with unequal splitting ratio can achieve asymmetry between clockwise and counter-clockwise traversal of the NOLM. Light pulses traversing the loop from the low-intensity port of the coupler can experience a lower nonlinear phase shift than pulses from the other port. This can result in an intensity dependent differential phase shift, and transmission of the NOLM. High intensity pulses at the input port can give rise to a larger differential phase shift. The embodiment can act as an intensity filter. Since the imbalance exists for both high and low intensities, there can be leakage at low intensity, so the tap ratio can be close to unity. A bi-directional amplifier can be asymmetrically placed and be used with a 150:50 coupler. The asymmetry introduced by the location of the amplifier can result in amplified pulses traversing unequal lengths in the clockwise and counter-clockwise directions, accumulating different nonlinear phase shifts. An intensity dependent transmission can be introduced at the output of the interferometer.

Leakage at low intensity can be improved with a balanced 50:50 coupler and another way of unbalancing the loop. Low intensity leakage can be improved by replacing the bi-directional amplifier with an asymmetrically placed loss element. The presence of an attenuator in the NOLM can result in high insertion loss. A dispersion-unbalanced NOLM can rely on the change in pulse shape and intensity of solitons resulting from the change in balance between dispersion and nonlinearity as the pulses traverse the two halves of the NOLM. This technique avoids low intensity leakage and signal attenuation. Fiber lengths of several soliton periods can be required to achieve adequate differential phase change, and there can be significant pulse broadening that can require a recompression step. Since dispersion can be used for intensity discrimination, the characteristics of the embodiment can be wavelength dependent.

Figure 2:
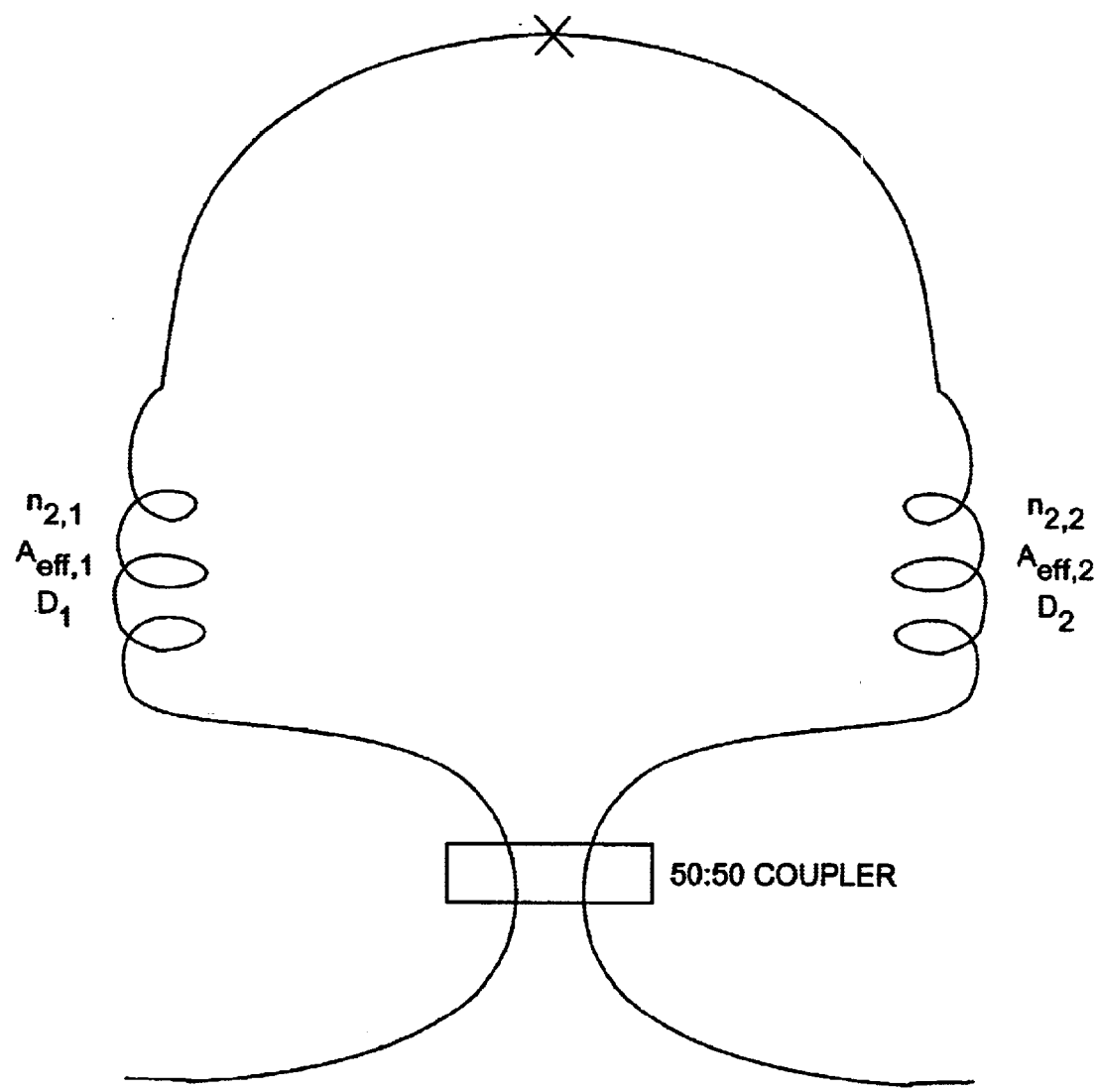
FIG. 2 is an embodiment of a non-linearity unbalanced nonlinear loop mirror.

A nonlinearity-unbalanced nonlinear optical loop mirror (NU-NOLM) can include at least two adjoining fibers with different effective nonlinearities to unbalance the interferometer and/or to provide intensity-dependent switching. The dispersion can be selected for multi-wavelength operation. The effective nonlinearity can be defined as $n_2/A_{\it eff}$, so the imbalance can occur with different fiber dopings that change the nonlinear index-of-refraction $n_2$ and/or by using fibers with different effective areas $A_{\it eff}$. In the embodiment of FIG. 2, switching can be achieved by changing the balance between nonlinearity and dispersion. This can be similar to the dispersion-unbalanced NOLM; it can use solitons and lengths of several soliton periods to accumulate imbalance between the two directions. With the NU-NOLM, low-intensity signals or noise, propagating in the linear regime of the fiber, can be unaffected by the change in effective nonlinearity. The NU-NOLM can appear to be balanced for low-intensity signals. Low-intensity light can be substantially completely reflected. For high-intensity signals propagating nonlinearly in the fiber, the difference in nonlinearity can lead to changes in the pulse intensity. The pulse intensity profile can be different in the two directions, which can result in a different nonlinear phase shift for the two directions, and an intensity-dependent transmission.

Figure 3A:
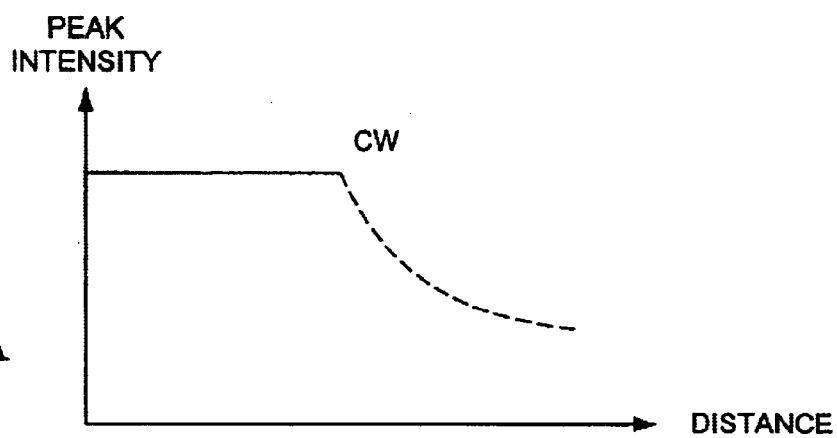
FIGS. 3(a) is a graph illustrating the peak intensity in NU-NOLM for pulses travelling clockwise.
Figure 3B:
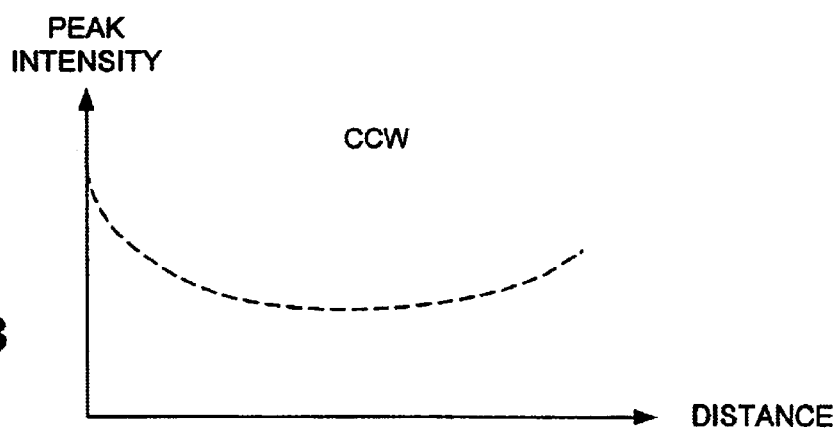
FIG. 3(b) is a graph illustrating the peak intensity in NU-NOLM for pulses travelling counter-clockwise (CCW) directions, such as from FIG. 3(a).
Figure 3C:
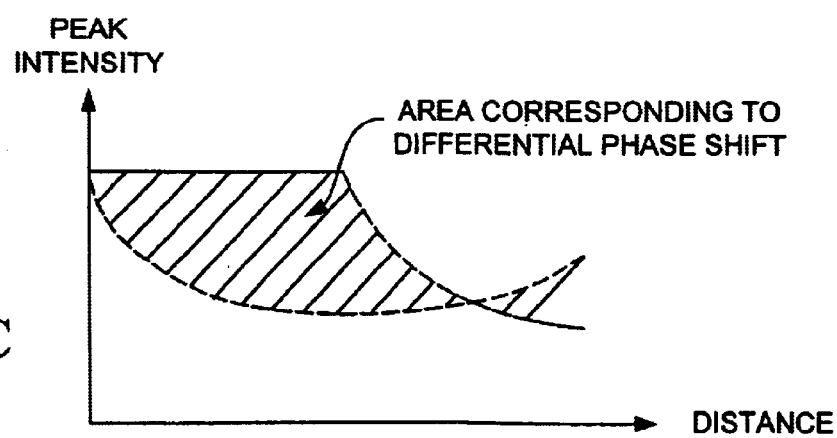
FIG. 3(c) is a graph illustrating the non-reciprocal behavior in the two directions leads to a differential phase shift, such as from FIGS. 3(a)–3(b).

A nonlinear signal can experience a difference in propagation. In the embodiment 200 of FIG. 2, the higher effective nonlinearity fiber is on the left side of the loop and the lower effective nonlinearity fiber is on the right side of the loop. The signal intensity can correspond to a fundamental N=1 soliton in the higher nonlinearity fiber. The pulse propagating in the clockwise direction may not change intensity in the first half of the loop. The pulse propagating in the clockwise direction can broaden and decrease in intensity in the second half of the loop (FIG. 3a). The counter-clockwise propagating pulse can broaden and decrease in intensity in its first half of propagation, and can return toward its original pulse width in the second half of its propagation (FIG. 3b). Comparing FIGS. 3a and 3b, the differential phase shift between the two arms can be proportional to the difference in area under the two curves (FIG. 3c). The goal of the NU-NOLM design can be to maximize the area of the difference in FIG. 3c. From FIG. 3c, one difficulty of the NU-NOLM can be a difficulty in matching the pulse shape at the output of the two directions, leading to incomplete switching and/or pulse shape distortions.

Figure 4:
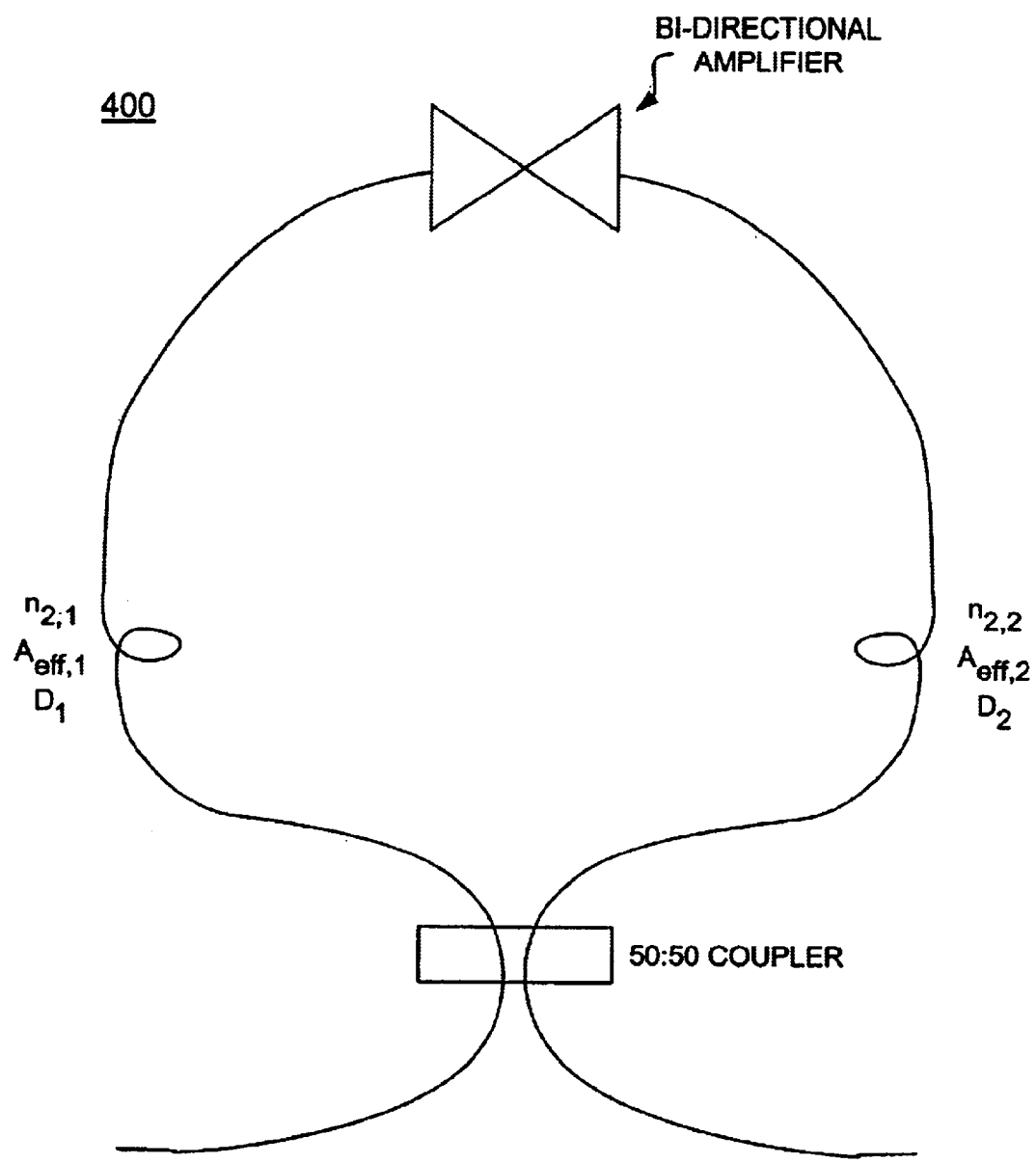
FIG. 4 is an embodiment of a nonlinearity-unbalanced amplifying loop mirror with a bi-directional amplifier at the mid-point of the loop.

One embodiment of the NU-NOLM 400 that can result in improved switching behavior is shown in FIG. 4. To enhance the nonlinearity [un]balance while reducing the required fiber length, a bi-directional optical amplifier can be placed in the loop mirror, for example, near the mid-point. A nonlinearity-unbalanced nonlinear amplifying loop mirror (NU-NALM) can provide amplification. For low-intensity signals the configuration with the mid-stage amplifier can be balanced and may not result in an output. For the nonlinear signal the amplifier can accentuate the distinction between the clockwise nonlinear phase shift and counter-clockwise nonlinear phase shift.

In one embodiment, the low and high nonlinearity fibers can have equal lengths. The normalized nonlinear phase shift in the left segment can be, for example, seven; while the normalized nonlinear phase shift in the right segment can be, for example, one. In one embodiment, this difference can be achieved with high-nonlinearity fiber on one side and standard fiber such as SMF-28 in the other side. In another embodiment, this nonlinearity difference can be obtained with dispersion-compensating fiber in one side and standard fiber in the other side. The mid-stage amplifier can have a gain of, for example, 10 dB. In this example, the normalized nonlinear phase shift in the clockwise direction can be 7+10×1=17, while the nonlinear phase shift in the counter-clockwise direction can be 1+10×7=71. The differential normalized phase shift 71−17=54. In another example, if the gain were unity and pulse shape changes were being used to cause intensity changes, then the maximum normalized phase shift can be about 7−1=6, which can be about an order of magnitude smaller.

The NU-NALM can differ from the NU-NOLM by operating on the basis of intensity differences may not require a delicate balance between nonlinearity and dispersion. As a consequence, the NU-NALM may not require solitons. The NU-NALM may not require long lengths of fiber corresponding to several soliton periods. Fiber lengths can be less than a soliton period so as to minimizing pulse shape distortions. With less than a soliton period, incomplete switching due to pulse shape differences in the two directions of the NU-NOLM can be avoided. For the NU-NALM the difference in phase shift can be much larger per unit fiber length than for the NU-NOLM. The phase shift can be made arbitrarily large by increasing the gain. Reflections can be avoided that can cause the NU-NALM to lase due to bi-directional amplification. The NU-NALM can be surrounded with isolators in the transmission system.

The NU-NALM can have one or more of a balanced configuration, nonlinearity unbalancing, pulse shape changes, and/or interaction between different wavelength channels. With the balanced configuration, a bi-directional amplifier can be placed approximately at the center of the embodiment, for common mode gain to each direction around the loop. For low intensity signals, the configuration can appear substantially completely balanced. For nonlinearity unbalancing, the two fibers surrounding the amplifier can have different effective nonlinearities. The imbalance can be selected so that at the operating signal intensity a roughly $\pi$ phase shift between the two directions can be achieved. For pulse shape changes, the two fiber lengths can be chosen so that dispersion can be relatively unimportant (e.g., a fiber length shorter than a dispersive length). With an effective nonlinearity imbalance in the loop, the dispersion can be independently set to meet dispersive length and/or walk-off criteria. For interaction between different wavelength channels, the walk-off length can be to be shorter than the relevant fiber lengths to minimize cross-talk between channels.

The NU-NOLM and/or NU-NALM embodiments can include polarization controllers in the loop to align the polarization for the two counter-propagating directions around the loop. Specialty fibers can reduce the need for polarization controllers or sensitivity to their settings. In various embodiments, polarization maintaining fiber and/or circularly-polarized fibers can reduce the need to align the polarization in the two directions. Improvements in the polarization properties of the fiber can complement requirements on the dispersion and nonlinearity for the NU-NOLM and/or NU-NALM.

SNR boosting can include operating simultaneously for multiple wavelength channels without cross-talk. Multiwavelength operation for the NU-NOLM and/or NU-NALM can be achieved by controlling the walk-off between channels. The walk-off length between adjacent channels can be much shorter than relevant fiber lengths. Rapid walk-off between channels can lead to reduced interaction length and/or less cross-talk penalty between channels. Higher nonlinearity fiber can have a rapid walk-off between channels. NOLM embodiments can be biased to operate near a local maximum peak in transmission. Phase changes due to cross-phase modulation can lead to minimum change in transmission.

Walk-off between different channels can be controlled by the group-velocity dispersion in the fiber. With a roughly linear slope of the group velocity in the vicinity of operating wavelengths, the largest cross-talk can result from nearest best neighbor (or adjacent) wavelength channels. Since the dispersion can be particularly large in higher nonlinearity fiber, one embodiment includes high nonlinearity segments in dispersion compensating fibers (DCF), which can be commercially acquired. DCF's can have a large dispersion (e.g., about −85 ps/nm-km near 1550 nm) and a large effective nonlinearity due to the increased germanium content and small core size. Low-nonlinearity fiber can be implemented in standard fiber, such as SMF-28, which can have a relatively high dispersion (e.g. about +16 ps/nm-km near 1550 nm) and a low effective nonlinearity due to the large core size.

One embodiment of a NOLM, such as a NU-NALM, has walk-off. In one example, the high-nonlinearity segment can include Lucent DCF fiber, while the low-nonlinearity segment can include Corning SMF-28 fiber. The SMF-28 fiber can have $n_2 \sim 2.04 \times 10^{-20}$ m$^2$/W and an effective area of about 86 $\mu$m$^2$, while the effective nonlinearity ($n_2/A_{eff}$) can be a factor of ~6.25 times larger in the DCF fiber. The dispersion of the DCF can be about −85 ps/nm-km, while the dispersion for the SMF-28 fiber can be about +16 ps/nm-km near 1550 nm. An RZ 40 Gb/s signal can be transmitted with a pulse width of 5 psec, and the channel spacing can be 200 GHz or about 1.6 nm. The walk-off length can be defined as $L_{wo}$= 2×T/(D Δλ), where T can be the pulse width and Δλ can be the channel spacing. In the DCF, the walk-off length can be about 73.5 m, while in the SMF-28 fiber the walk-off length can be about 390.6 m. Therefore, with lengths greater than 0.5 km in each side of the NU-NALM, there can be adequate walk-off to minimize cross-talk between channels.

An SNR booster can reflect one or more design criteria. The NU-NALM can have an intensity-dependent transmission that reflects at low intensities and transmits at high intensities. The cross-talk between different channels can be minimized by making each fiber length longer than the walk-off length between adjacent channels. Since the NU-NALM can be self-switching, it can be relatively independent of the input state of polarization. The coupler and amplifier used in the NU-NALM can have polarization-independent performance. The NU-NALM can be a broad-band embodiment. The 50:50 coupler can be broadband. The dispersion can insure sufficient walk-off between wavelength channels. Due to the self-switching in a NU-NALM, timing recovery may not be necessary. Since the embodiment can be all-optical, O/E or E/O conversion may not be required. By maximizing the effective nonlinearity unbalance and increasing the bi-directional amplifier gain, the signal power can be made close to that in a typical transmission system. An optical amplifier before the NU-NALM can boost the signal level and can compensate for any insertion loss. The NU-NALM can have net gain and a high throughput from the intra-loop amplifier. By making the fiber lengths shorter than a soliton period or dispersive length, the pulse shape distortion can be minimized. The NU-NALM can be an all-fiber embodiment that can include commercially available optical amplifiers and fibers.

One simulation of an embodiment uses numerical solutions of the nonlinear Schroedinger equation. A bi-directional amplifier can have, for example, 10 dB gain. The amplifier can include erbium-doped fiber, with, for example, an operational wavelength of 1550 nm. The low nonlinearity fiber can include an SMF-28 fiber with properties such as $n_2$=2.04×10$^{-20}$ M$^2$/W, $A_{eff}$=86 $\mu$m$^2$, and D=16 ps/nm-km at 1550 nm. The high-nonlinearity, rapid walk-off fiber can include a Lucent DCF with properties such as $n_2$2.96×10$^{-20}$ m$^2$/W, $A_{eff}$=20 $\mu$m$^2$, and D=−85 ps/nm-km at 1550 nm. The coupler at the base of the NOLM can be a 50:50 coupler.

The lengths of the two fibers can be determined from the soliton period and walk-off length constraints. The fiber lengths can be selected to be less than a soliton period long to reduce pulse shape distortion, and longer than a walk-off length between adjacent channels to reduce cross-talk between channels. The soliton period can be approximately the dispersion length (e.g., length scale over which dispersion can be important), and the soliton period can be given by $$z_0 = 0.322 \frac{\pi^2 c}{\lambda^2} \frac{\tau^2}{D}$$

which can be simplified near 1550 nm as $$z_0 \cong \frac{\pi}{8} \frac{\tau^2}{D}.$$

The walk-off length, which can be defined as the length over which pulses at two wavelengths begin and end with overlap at the half power points, can be given by $$L_{wo} = \frac{2\tau}{D\Delta\lambda}.$$

In one example, a 10 Gb/s channel with a pulse width of 20 psec and a nearest best neighbor channel spacing of 200 GHz, has corresponding lengths in the two fibers of:

$$DCF: \quad z_0 \cong 1.85 \text{ km}$$
$$L_{wo} = 294.1 \text{ m}$$
$$SMF\text{-}28 \text{ Fiber}: \quad z_0 \cong 9.82 \text{ km}$$
$$L_{wo} = 1.56 \text{ m}$$

In this example, if the NU-NOLM uses about 1.85 km of fiber of each type, both conditions, of soliton period and walk-off length, can be satisfied.

Figure 5:
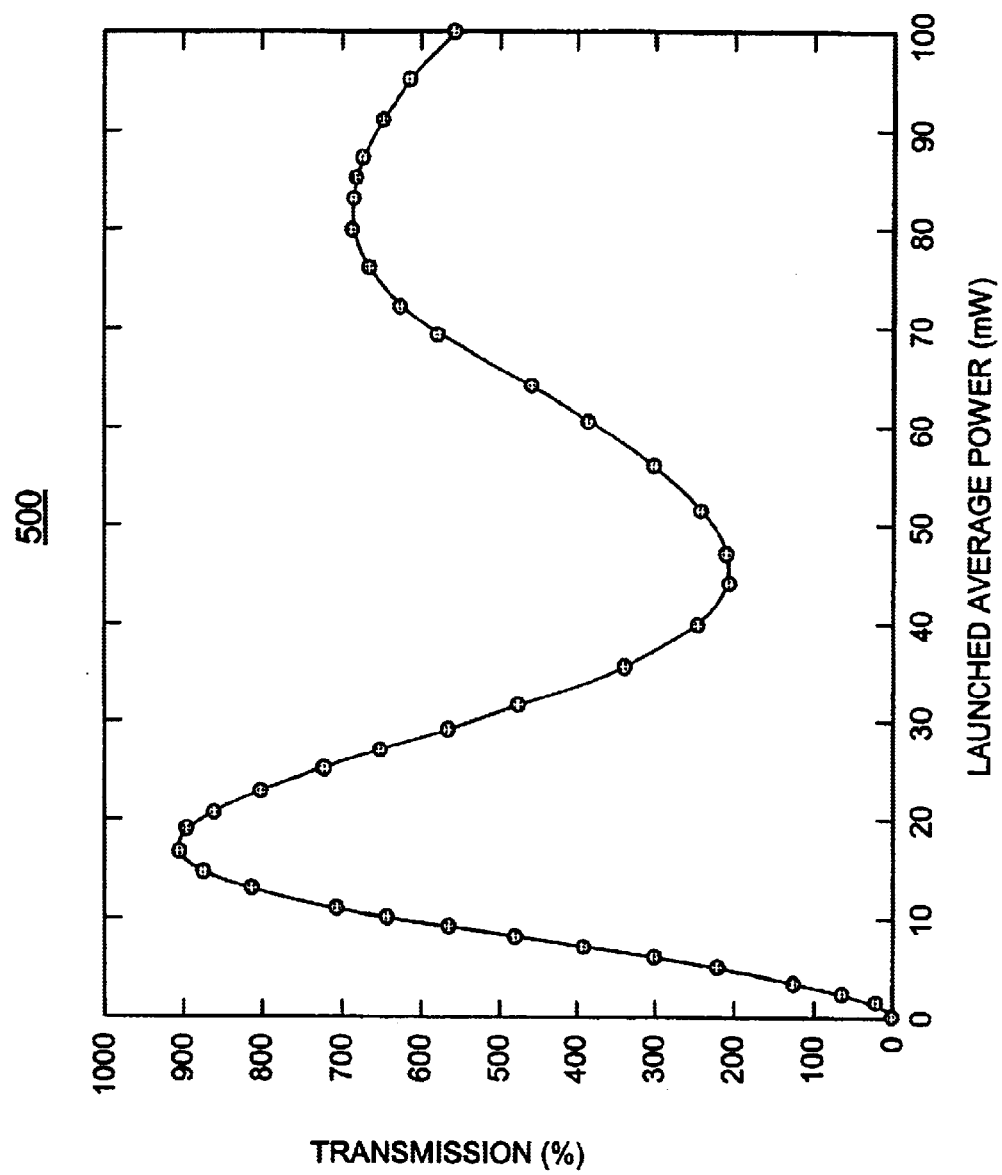
FIG. 5 is a graph illustrating one embodiment of simulated transmissions of NU-NALM with a 10 dB bi-directional amplifier at the mid-point of the loop.

Single wavelength operation of one embodiment of a NU-NALM has a 10 GHz repetition rate and 20 psec hyperbolic secant pulse input. FIG. 5 shows the nonlinear transmission as a function of average launched input power. FIG. 5 shows an efficient and near ideal nonlinear switching behavior. Peak transmission can be 900% at an input of 16 mW, corresponding to a maximum output average power of 144 mW. Given 10 dB gain amplifier within the loop, theoretical maximum output power that can be transmitted can be 160 mW, which can be 10% larger then the observed peak transmission.

Figure 6A:
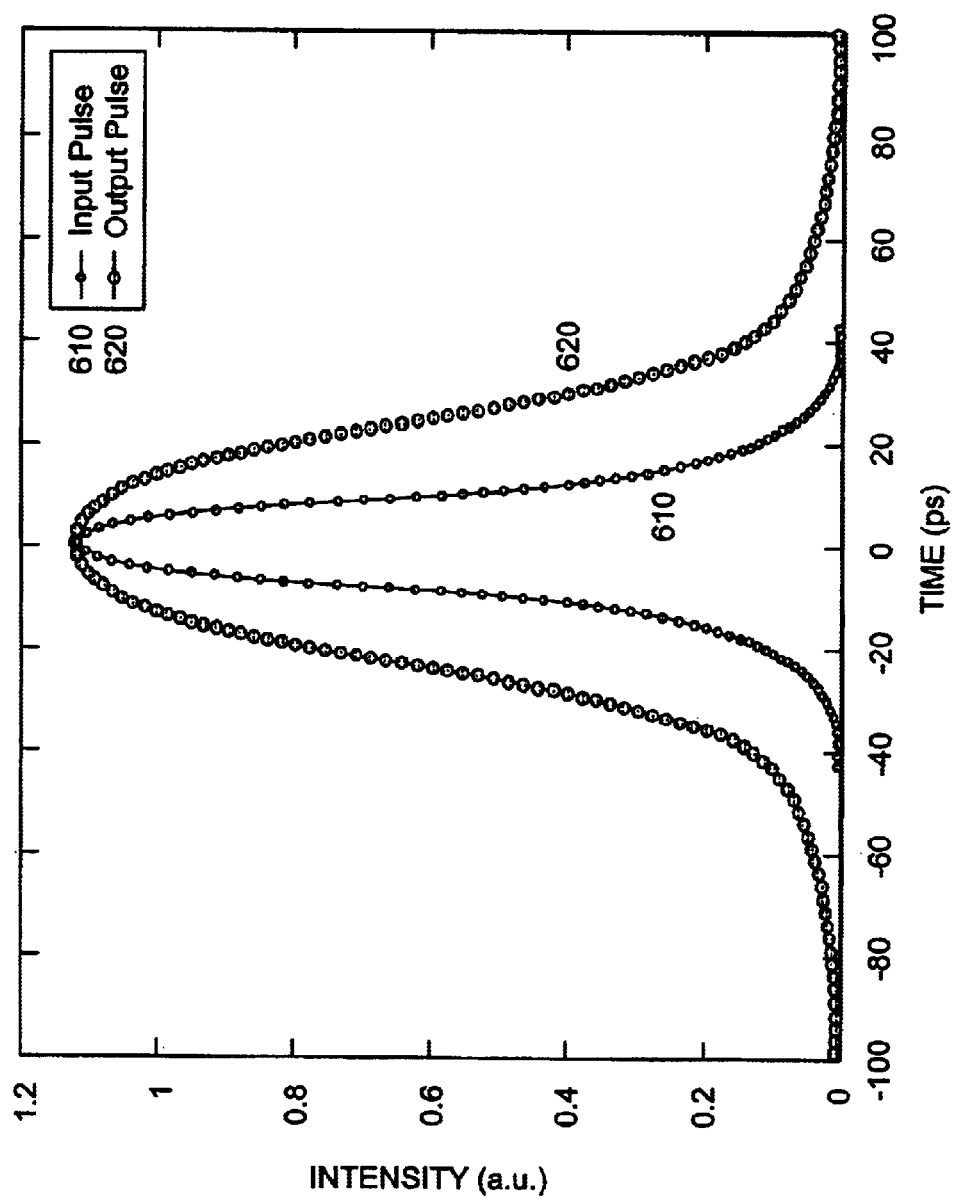
FIG. 6(a) is a graph illustrating one embodiment of input/output temporal pulse profiles of simulated NU-NALM with 10 dB gain, such as from FIG. 4.
Figure 6B:
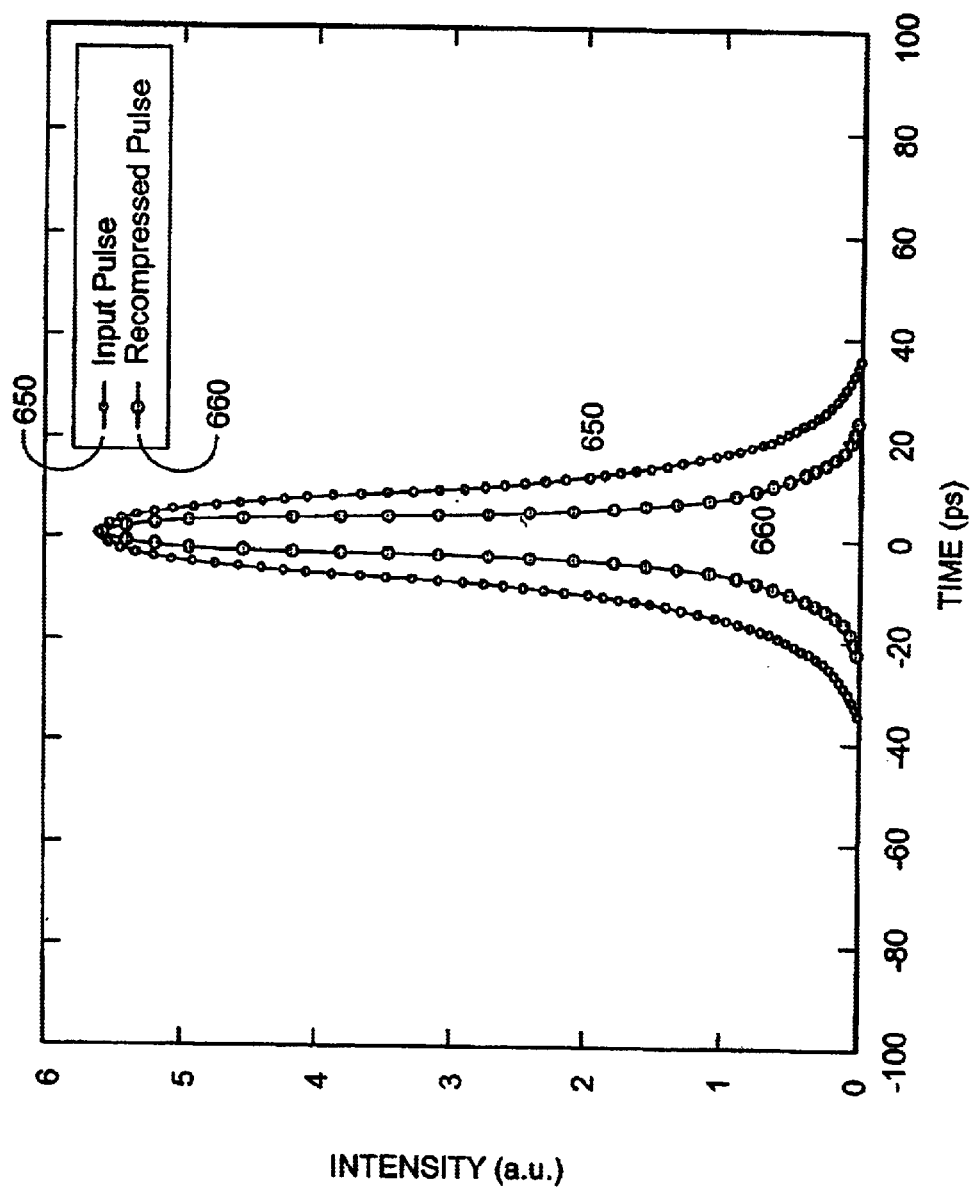
FIG. 6(b) is a graph illustrating one embodiment of an input/output temporal pulse profiles of simulated NU-NALM after recompression.

FIG. 6a shows the input pulse 610 and output pulse 620 shape at the peak transmission point, normalized to equal heights. There may be no pulse break-up and/or pulse shape distortion other than broadening. The input pulse 610 can be about 20 psec wide FWHM. The output pulse 620 can be about 50psec wide. Pulse broadening can be due to chirp from normal dispersion (such as in the DCF) and/or self-phase modulation. The frequency chirp can be nearly linear. A pulse can be recompressed using gratings and/or propagation in fibers. When the output pulse 620 from FIG. 6a can be propagated through 3 km of standard fiber with an anomalous dispersion of D=+16 ps/nm-km, the pulse can compress down from over 50 psec to about 10.2 psec (FIG. 6b).

Figure 7:
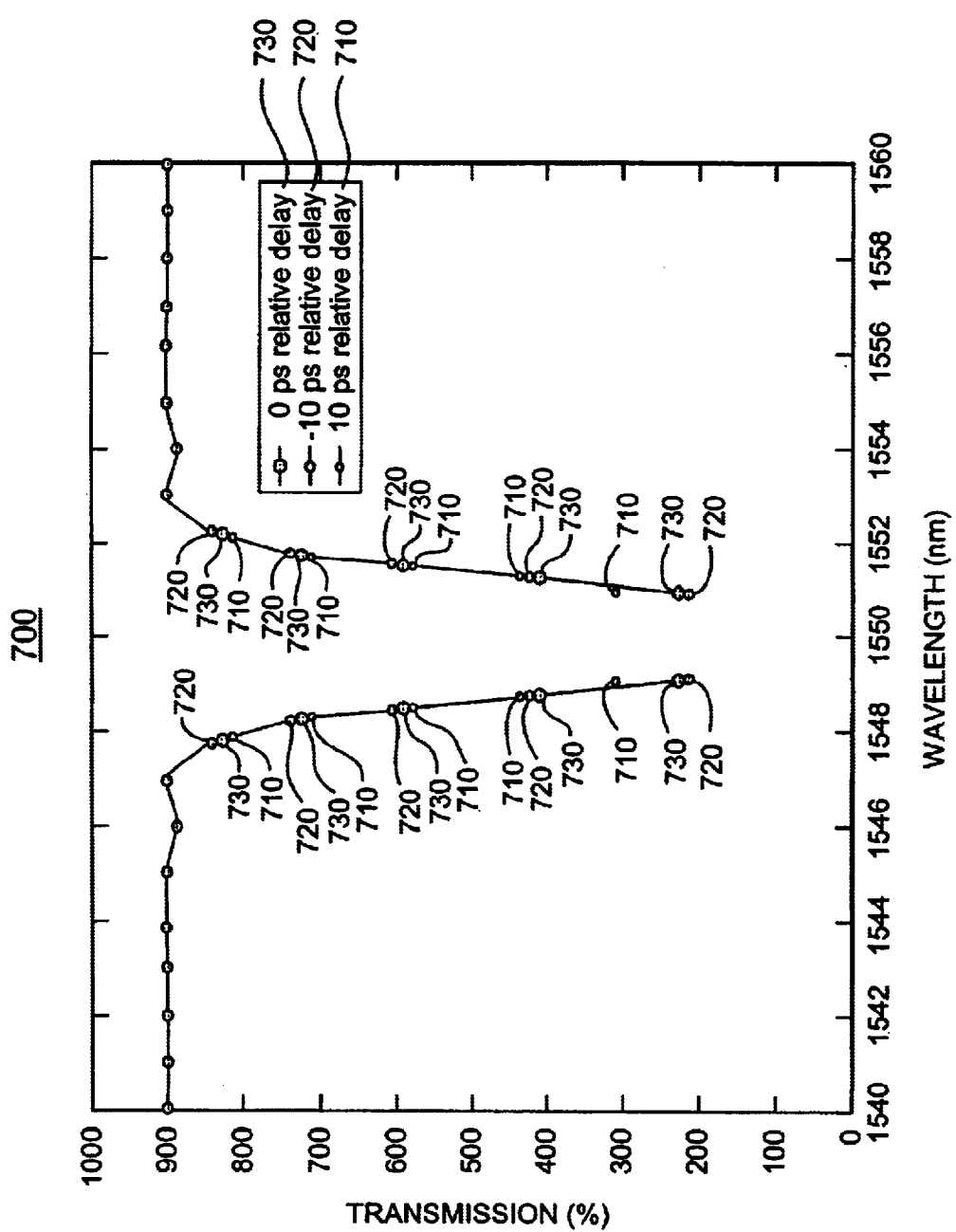
FIG. 7 is a graph illustrating simulated transmission of NU-NALM for a 1550 nm pulse co-propagating with a second pulse launched.

The NU-NALM can have multi-wavelength operation. One embodiment of a two-wavelength system has the original wavelength at 1550 nm. The second wavelength can be added, separated by $\Delta\lambda$. The transmission at 1550 nm can be observed. The nearest best neighbor wavelengths can cause the largest cross-talk penalty. In the embodiment of FIG. 7, the nonlinear transmission for a 16 mW input at 1550 nm can be monitored when a second wavelength can be added in the wavelength range between 1540 and 1560 nm with 16 mW input. The 730 curve can correspond to the two wavelength pulses being launched coincident in time, the 710 curve can be for an initial separation of −10 psec (half a pulse width), and the 720 curve can be for an initial separation of −10 psec. The temporal launch position can appear to have little effect on the transmission of the 1550 nm channel. The cross-talk between channels can be minimal after a channel spacing of $|\Delta\lambda|$~3 nm. One design included channel spacing of 1.6 nm. Near doubling of the channel spacing can arise from the broadening in FIG. 6a, which can lead to a longer walk-off length, such as in the standard SMF-28 fiber. The longer pulse width can be compensated by a larger $\Delta\lambda$ in the walk-off length formula. One way to reduce $|\Delta\lambda|$ may be to pre-chirp the input pulses so the broadening may not be as severe within the NU-NALM embodiment. The fiber lengths can be optimized to reduce the minimum channel spacing required.

Figure 8:
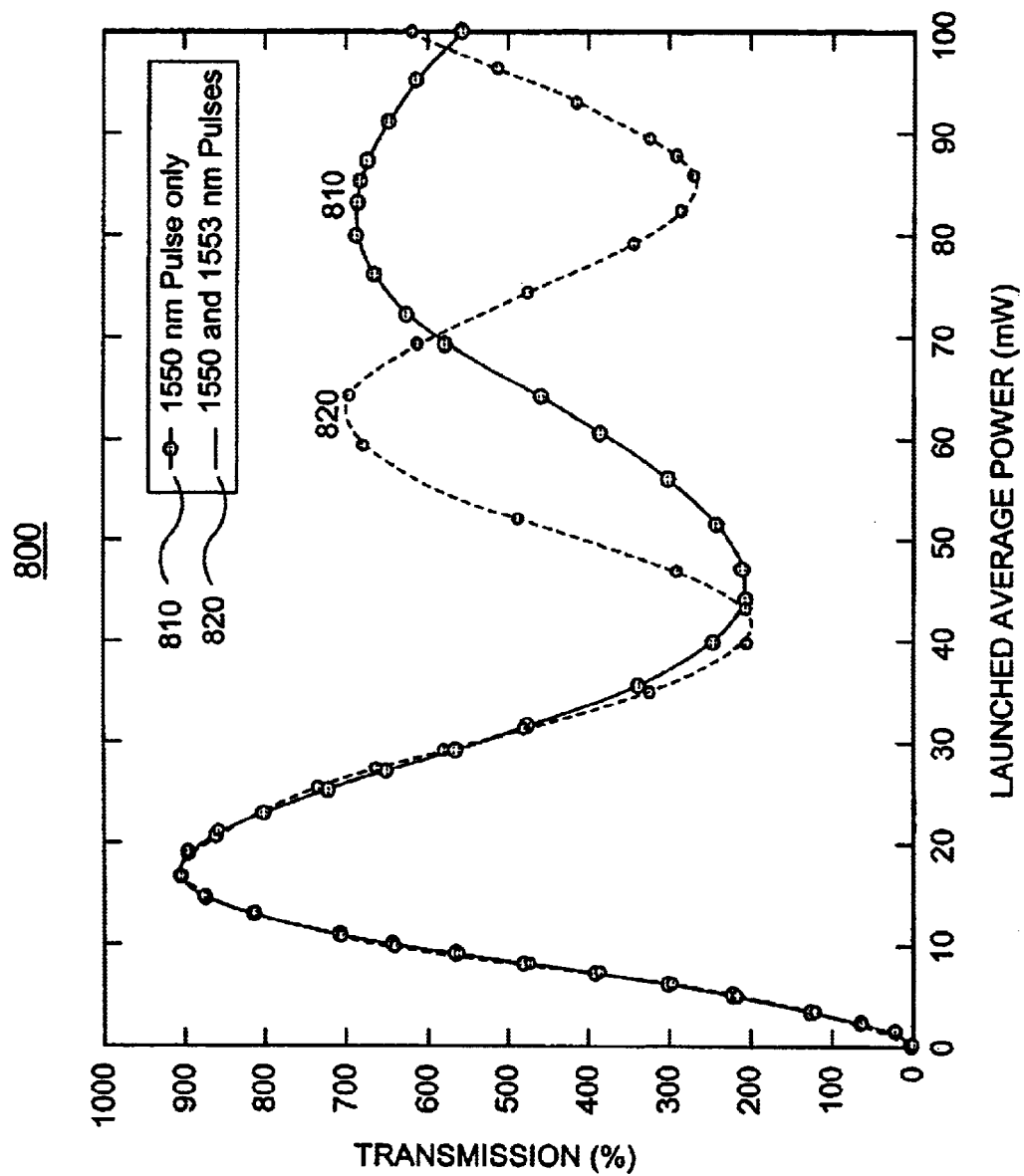
FIG. 8 is a graph illustrating simulated transmission at 1550 nm of 10 dB NU-NALM for a 1550 nm pulse and for co-propagating 1550 nm and 1553 nm pulses.

Some embodiments have nonlinear transmission curves of one or two wavelength channels. In FIG. 8, the nonlinear transmission as a function of single-channel input average power can be plotted for the single channel for the 1550 nm case (810 curve, as in FIG. 5) and when a second channel at 1553 nm can be added (820 curve). The two wavelength pulses can be launched coincident in time at the input. The periodicity of the transmission at higher powers can change considerably due to cross-phase modulation between the two channels. The first transmission can feature powers of up to ~30 mW per channel, almost twice the operating power at the transmission peak, which may be hardly affected by addition of the second channel. The pulse shape in FIG. 6 may not change when the second wavelength channel is added.

In one embodiment, a NU-NALM for 10 Gb/s, 20 psec RZ pulses includes 1.85 km lengths of DCF and SMF-28 fiber along with a 10 dB bi-directional erbium-doped fiber amplifier and a 50:50 coupler at the base of the NOLM. The design can be all-fiber, and/or elements can be commercially acquired. A peak transmitted power that can be 9× the input can be obtained at an input average power of 16 mW. There may be no pulse break-up. There may be a 2.5× pulse broadening that can be easily compensated with fiber propagation. Selecting a minimum channel spacing of 3 nm can minimize interaction between different wavelength channels.

Some embodiments of the NU-NALM are compatible with 10 Gb/s WDM transmission systems. 10 Gb/s or OC-192 systems can use an average power per channel of 6 dBm (4 mW) to 10 dBm (10 mW). 10 Gb/s systems have a channel spacing of 100 GHz or 0.8 nm, with recent state-of-the-art systems having a spacing of 50 GHz or 0.4 nm. DCF or some form of dispersion compensation can be used periodically to avoid significant pulse broadening.

Figure 9A:
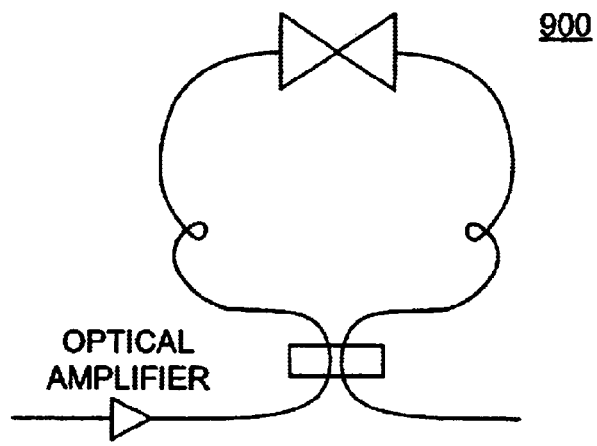
FIG. 9(a) shows an embodiment of a NU-NALM SNR booster device with a preamplifier to amply signals to levels required for optimal operations.

A power level for the NU-NALM can be within a factor of 4 of the usual power level in the system. An optical amplifier can be placed before the NU-NALM to boost the signal level to the 16 mW range (FIG. 9a). The gain in the NU-NALM can be adjusted to shift the peak to the typical power level used in an OC-192 system.

Figure 9B:
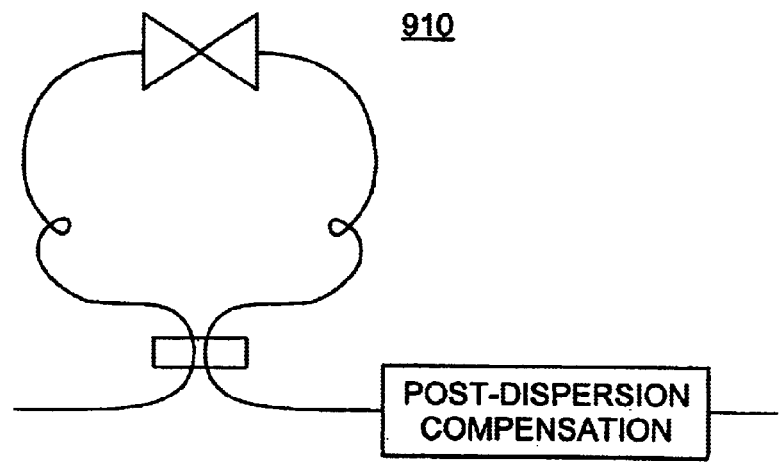
FIG. 9(b) shows an embodiment of a NU-NALM SNR booster devices with post-dispersion compensation to restore output pulse width, such as from FIG. 9(a).
Figure 9C:
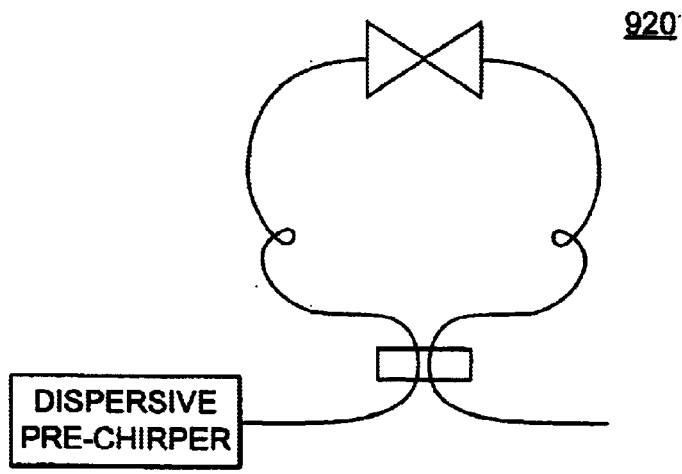
FIG. 9(c) shows an embodiment of a NU-NALM SNR booster devices with a dispersive pre-chirper to minimize effects of pulse broadening, such as from FIG. 9(a).

Pulse broadening in some embodiments the NU-NALM can be handled in a number of ways. A post-compensator that provides an anomalous (e.g., positive sign) of dispersion can be used to narrow up the pulses (FIG. 9b). A pre-chirper that linearly chirps the pulse with anomalous dispersion can be used in advance of the NU-NALM (FIG. 9c). The elements in FIGS. 9b and 9c can include appropriate lengths of fiber, bulk gratings, dispersive interferometers, and/or chirped fiber gratings. The fiber in the transmission system itself can have anomalous dispersion. Transmission through the fiber link may serve to compensate for the pulse broadening. Some embodiments of the NU-NALM can be part of the dispersion compensation used for the OC-192 system.

Figure 10:
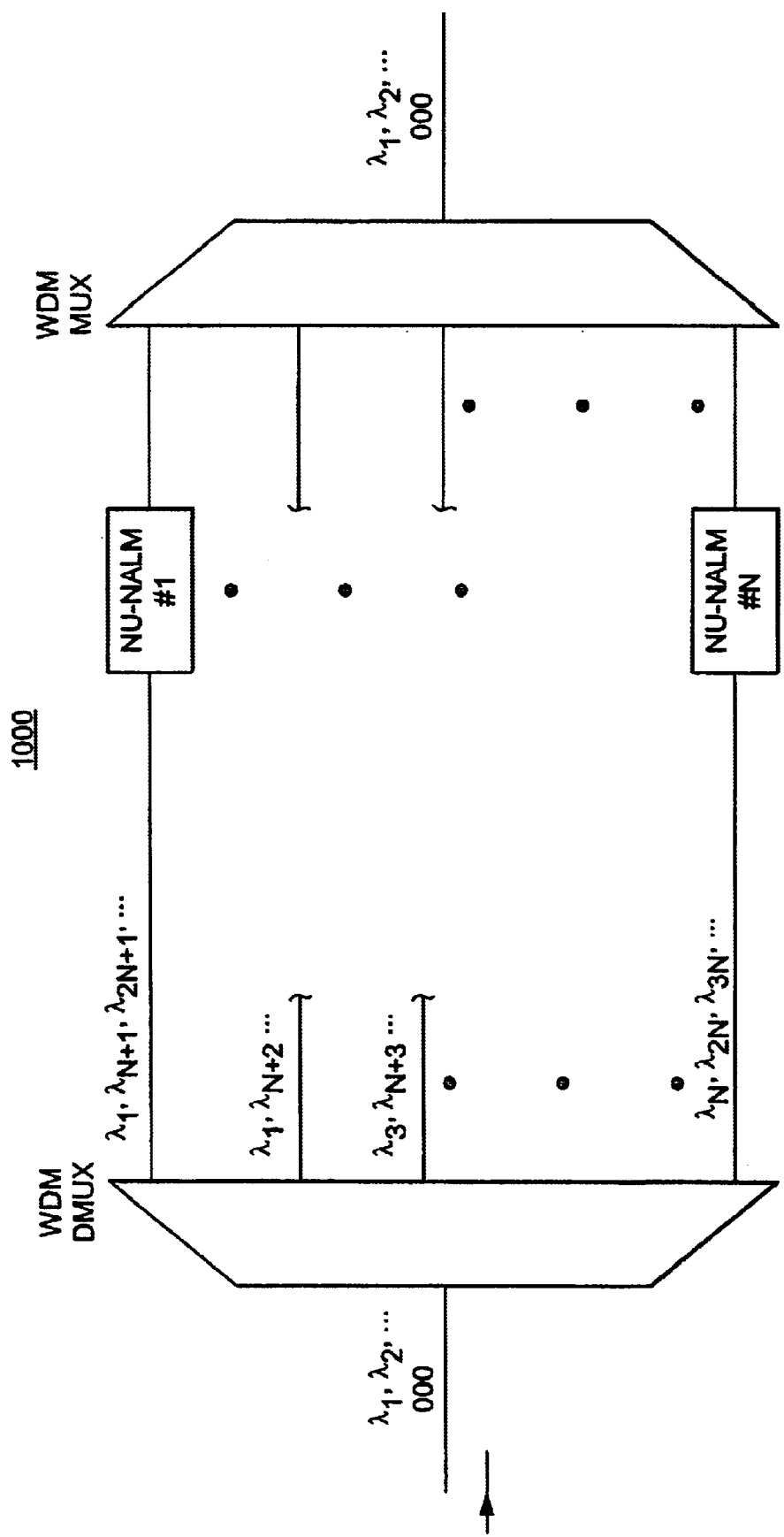
FIG. 10 shows an embodiment of a WDM system with NU-NALM SNR booster devices.

Wavelength multiplexers and demultiplexers surrounding the NU-NALM embodiments can accommodate channel spacing requirements to avoid cross-talk between channels (FIG. 10). If $\Delta\lambda$ can be the minimum to channel spacing, incoming wavelengths can be demultiplexed so adjacent wavelengths to any one NU-NALM can be no closer than $\Delta\lambda$. If the minimum channel separation in the transmission system can be $\delta\lambda$, the number of NU-NALM embodiments operating in parallel can be approximately $\Delta\lambda/\delta\lambda$. For example, an embodiment described in the last section with $\Delta\lambda$~3 m can be used in a system with 100 GHz or $\delta\lambda$~0.8 nm minimum channel spacing. For example, four NU-NALM's can be in parallel, and the wavelength multiplexers and demultiplexers can be 4×1 and 1×4. Multiple NU-NALM's can be required. The number of NU-NALM embodiments can be much smaller than the number of wavelengths in a DWDM system. For electronic regeneration one embodiment per channel can be required. The SNR booster can lead to significant reduction in complexity, cost, and space requirements.

The NU-NALM embodiment has a bandwidth, or wavelength range over which the embodiment operates properly. Some factors that determine the bandwidth include one or more of:

Bandwidth of the 50:50 coupler used in the NOLM. Very broadband 50:50 couplers can be made.

Bandwidth of the bi-directional amplifier. For an erbium-doped fiber amplifier, the typical bandwidth can be for example, between 32–40 nm.

Bandwidth restriction due to dispersion in the fiber. Since the NU-NALM can be unbalanced by nonlinearity rather than dispersion, the dispersion can insure sufficient walk-off between adjacent wavelength channels. Although some simulations assume a constant value for dispersion, dispersion can vary with wavelength. The dispersion can, to first order, be linear with a slope of approximately 0.0/psec/nm-km. Fairly high values can be used for the dispersion (e.g., $|D|$ of 16 and 85 ps/nm-km), fractional change in dispersion over the bandwidth of the amplifier may not be significant.

A restriction on the bandwidth of the NU-NALM can arise from the bandwidth of the bi-directional amplifier, which can be less than, for example, about 40 nm.

An SNR booster can be a first step toward 3R regeneration for fiber-optic transmission systems. An all-optical SNR booster can be based on NU-NOLM's and/or NU-NALM's that reject in-band and out-of-band noise and/or operate for multi-wavelength signals in a WDM system. The NU-NOLM includes two fibers with different effective nonlinearities. The NU-NALM can add a bi-directional amplifier near the center of the loop mirror. In the NU-NALM the fiber lengths can be shorter than a dispersive length to avoid pulse distortion and longer than a walk-off length between adjacent wavelength channels to avoid cross-talk between channels.

One embodiment of the NU-NALM can have 10 Gb/s, RZ pulses with DCF fiber on one side and standard SMF-28 fiber on the other. Intensity dependent switching with peak transmission of 9× the input at an input average power of 16 mW can be obtained without pulse distortion and/or pulse break-up. Multi-wavelength operation with minimal cross-talk between channels can be obtained for a channel spacing of 3 nm or more. For application to an OC-192 system, an amplifier can be placed before the NU-NALM to boost the input by a factor of four. A pre-chirper, dispersion compensation, and/or fiber propagation in anomalous dispersion fiber can be used to recompress pulse broadening in the embodiment. Wavelength multiplexers and demultiplexers can separate closely spaced DWDM channels to meet a minimum wavelength separation of the NU-NALM. The bandwidth of the NU-NALM can be set by the bandwidth of the bi-directional amplifier in the loop.

The optical sweeper can be used in a wide range of applications, all the way from very long haul systems all the way down to short haul systems. For example, in long haul systems it serves an important function in cleaning up the amplified spontaneous emission (ASE) from the amplifiers. In metro systems or metropolitan area network systems, the optical sweeper helps to clean up degradation from cross-talk in switches and ASE from amplifiers. In Internet Protocol networks or router networks, the optical sweeper can allow frame routing over long distances to reduce reliance on line cards. The optical sweeper can improve the reach of an all-optical transparent network by permitting signals to remain in the optical domain over longer spans.

The dominant cost in a WDM network can be the transponders, and increasing the distance between regenerators can lead to considerable savings.

Figure 11:
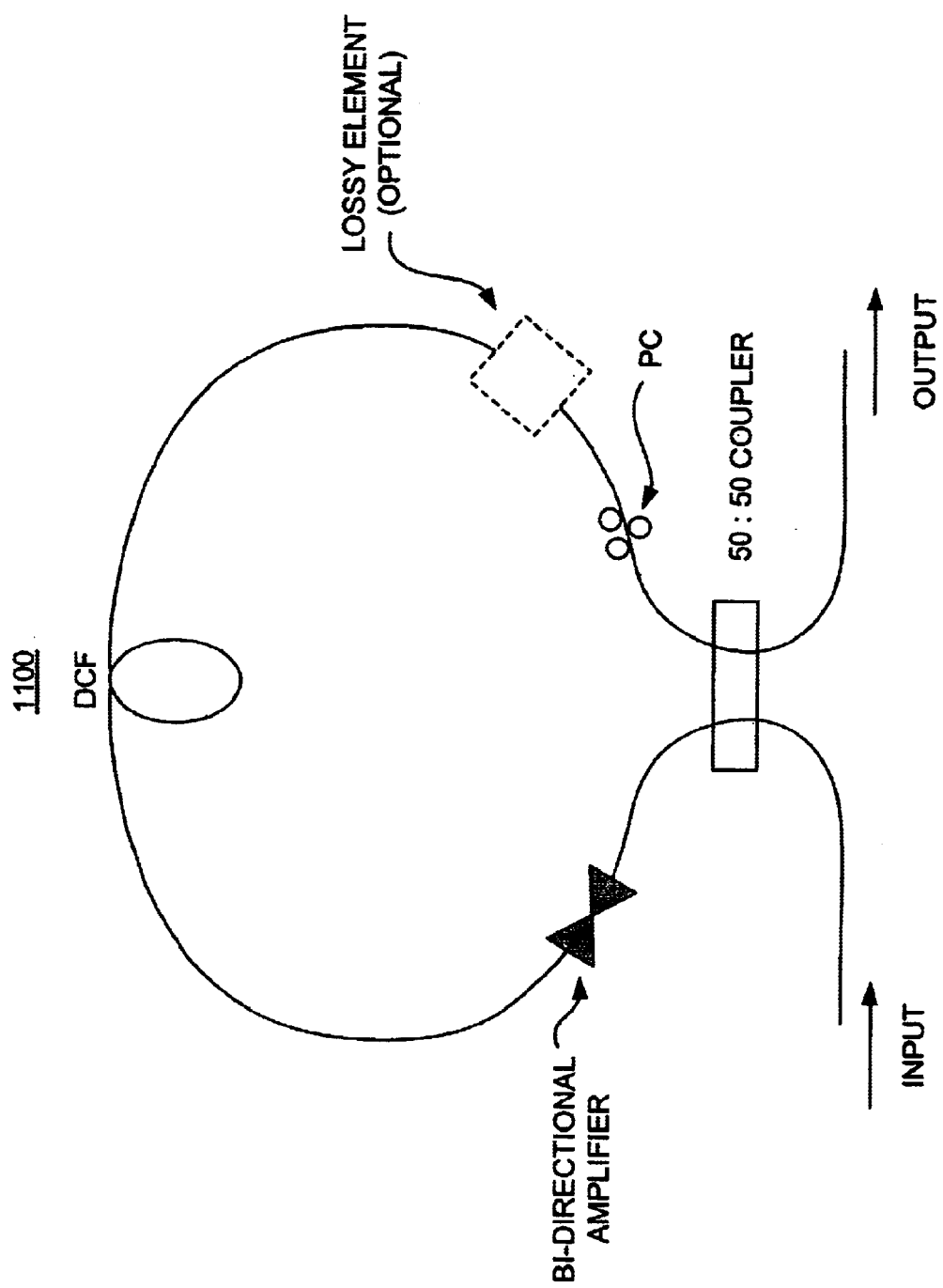
FIG. 11 shows an embodiment of a basic configuration of the optical sweeper.

FIG. 11 shows a configuration 1100 of an optical sweeper, comprising a simple loop mirror or Sagnac interferometer with an input and an output port. The ports can be coupled with a 50/50 coupler. The ports of the 50/50 coupler can be coupled in a loop. One end of the loop can include a bi-directional amplifier, an amplifier that amplifies signals in both directions. A long length of dispersion compensating fiber can be included. A lossy element can be included, for example at one end of the loop. A polarization controller or PC can be included.

This embodiment can boost signal-to-noise ratio, amplify, and/or dispersion compensate. Dispersion compensating fiber can have a small core size and higher nonlinearity that reduces switching power. Dispersion compensating fiber can have large dispersion that can lead to rapid walk-off between channels. Cross-talk between WDM channels can be minimized by rapid walk-off.

One embodiment of the bi-directional amplifier can have a gain between 25 and 30 dB. The lossy element can include add/drop multiplexers (ADMs), and/or gain equalizers.

Figure 12:
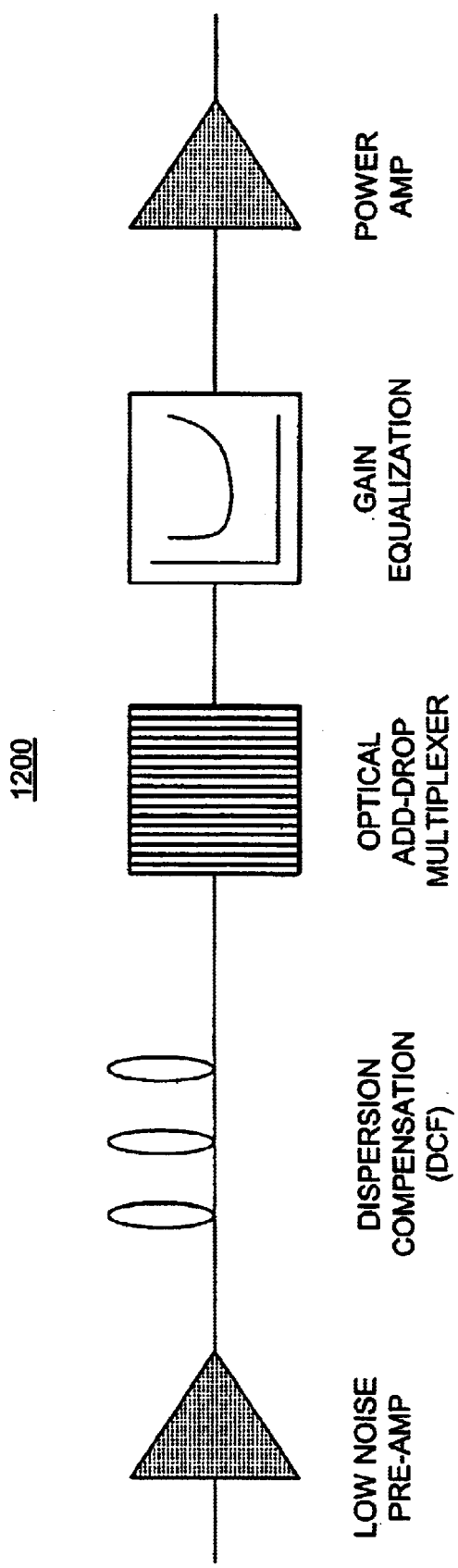
FIG. 12 shows an embodiment of a basic amplifier node.

One embodiment of an amplifier node 1200 is shown in FIG. 12. The ends include a low noise preamplifier and a power amplifier, in this example of a two-stage amplifier. The amplifier node 1200 can further include lossy elements, such as dispersion compensating fiber (DCF), optical add/drop multiplexers, and/or gain equalizers. The optical sweeper can wrap dispersion compensating fiber around the amplifier. The optical sweeper can include similar components. The optical sweeper can include a coupler and a polarization controller. The intensity dependent switching of the optical sweeper can improve signal-to-noise ratio performance.

The optical sweeper can include an all-fiber construction. The optical sweeper can include available commercial components. The optical sweeper can include intensity dependent switching, removing in-band and out-of-band noise. The optical sweeper can operate simultaneously on multiple wavelengths without cross-talk. The optical sweeper can include power levels comparable to power levels in transmission systems. The optical sweeper can amplify, dispersion compensate, and boost SNR by reconfiguration of the amplifier assembly.

There are some challenges met by the optical sweeper. A relatively high powered amplifier may be required for a large number of wavelengths. Polarization controllers in the loop can require active control to handle environmental changes. Channel spacings less than about 2 nm can require demultiplexing the input to several embodiments. For multiple wavelength operation with arbitrary bit patterns, cross-talk can be problematic. A WDM test-bed can confirm requirements.

The optical sweeper can have provide intensity dependent transmission to reject the noise. The optical sweeper can operate simultaneously for multiple wavelengths. The optical sweeper can be broadband. The optical sweeper can be independent of the input polarization. The optical sweeper can compatible with transmission line power levels.

Optic to electronic and electric to optic conversions can be avoided. Low insertion loss and high throughput can be demonstrated. Low dispersion can reduce pulse distortion. One embodiment can include an all fiber construction, such as from conventionally available components.

Figure 13:
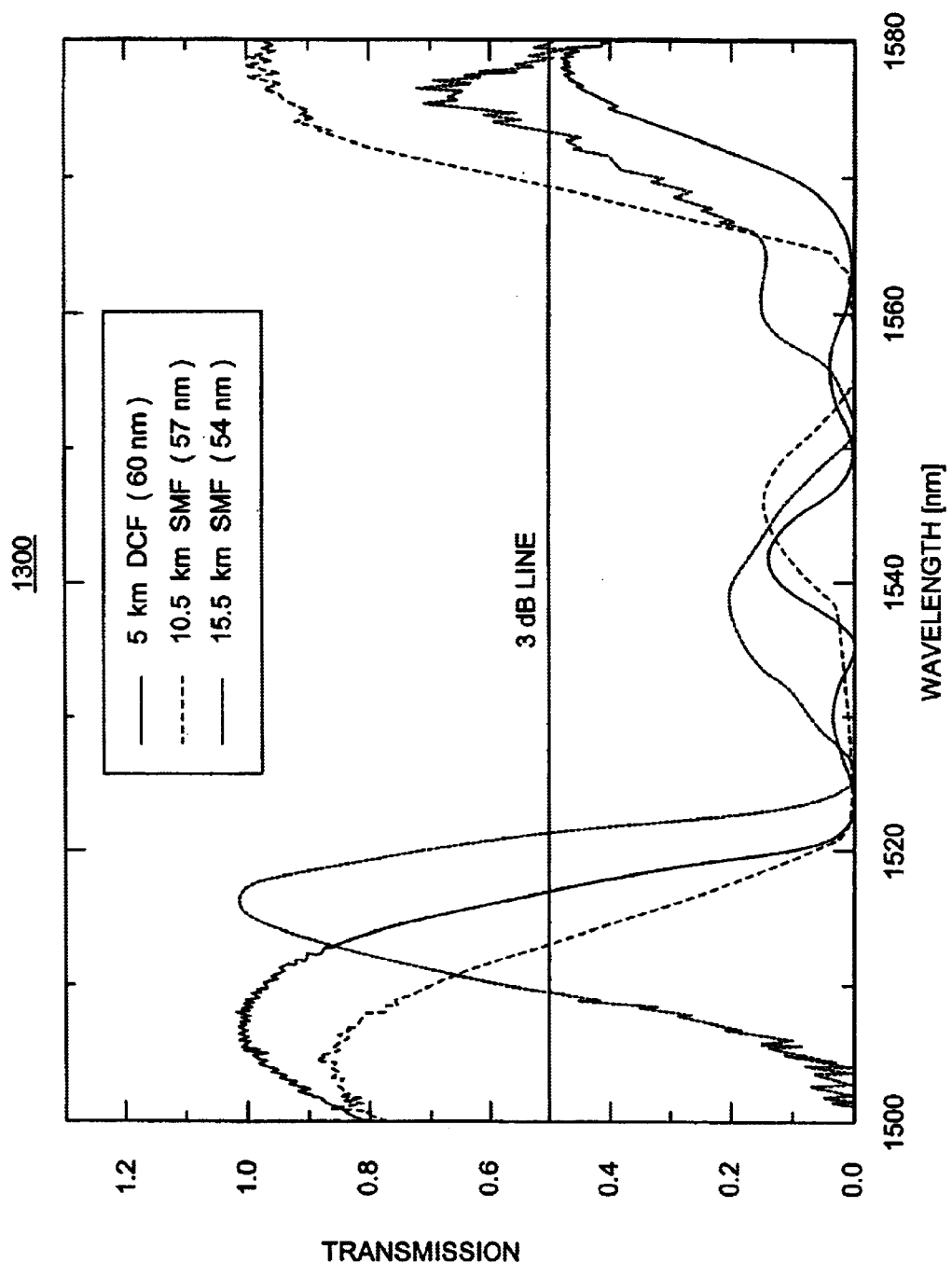
FIG. 13 is a graph illustrating one embodiment of a bandwidth of NOLM >50 nm.

The bandwidth can be set by the amplifier. In one embodiment, the bandwidth is not set by the loop mirror configuration or polarization controllers within the loop mirror. FIG. 13 shows experimental data 1300 for one embodiment of a NOLM. This embodiment lacks an amplifier. Amplifier bandwidth is not considered in this embodiment. Shown here are transmission versus wavelength curves for three embodiments of the NOLM. The solid curve can be for a 5 km length of dispersion compensating fiber, which can have a 3 dB bandwidth of about 60 nm. The dashed curve can be for a 10.5 km single mode fiber that can have a 3 dB bandwidth of 57 nm. The dotted curve can correspond to 15 km of single mode fiber (SMF) with a 3 dB bandwidth of 54 nm. The polarization controller in the loop can give a bandwidth greater than 50 nm. The fiber type in some embodiments may not affect the NOLM bandwidth. The fiber length can lead to minor changes in the bandwidth. For example, at 5 km the bandwidth can be about 60 nm; at 10 km the bandwidth can be about 57 nm; and at 15 km the bandwidth can be about 54 nm. Longer fiber length can change the environmental stability of the loop. Active control of the polarization within the loop may be needed.

A multistage amplifier can be combined with a signal-to-noise ratio booster. In system 1410 of FIG. 14(a), the gain can be split between G1 and G2, and the lossy element can be placed entirely in between. In 1420 of FIG. 14(*b*), some of the lossy elements can be included within the loop and some of the lossy elements outside the loop. Gain G1 and G2 can be split between amplifiers. Complexity of making one high power amplifier can be eliminated in some embodiments. Isolators can be included to suppress reflections.

Table 1430 of FIG. 14(*c*) shows input power, assumed to be −11 dBm, the gain of the first stage G1 in dB, the gain of the second stage G2 in dB, and the net output power Pout measured in dBm. For the same input power the gain can be split, in these examples to maintain a net gain of 30 dB. The top line has unity or no gain in the first stage and all of the gain in the loop. In the fourth case, half the gain, 15 dB, occurs in the ingress amplifier and about half the gain, 15 dB, within the loop. The output power may not change significantly, showing great flexibility in gain element placement.

Figure 15:
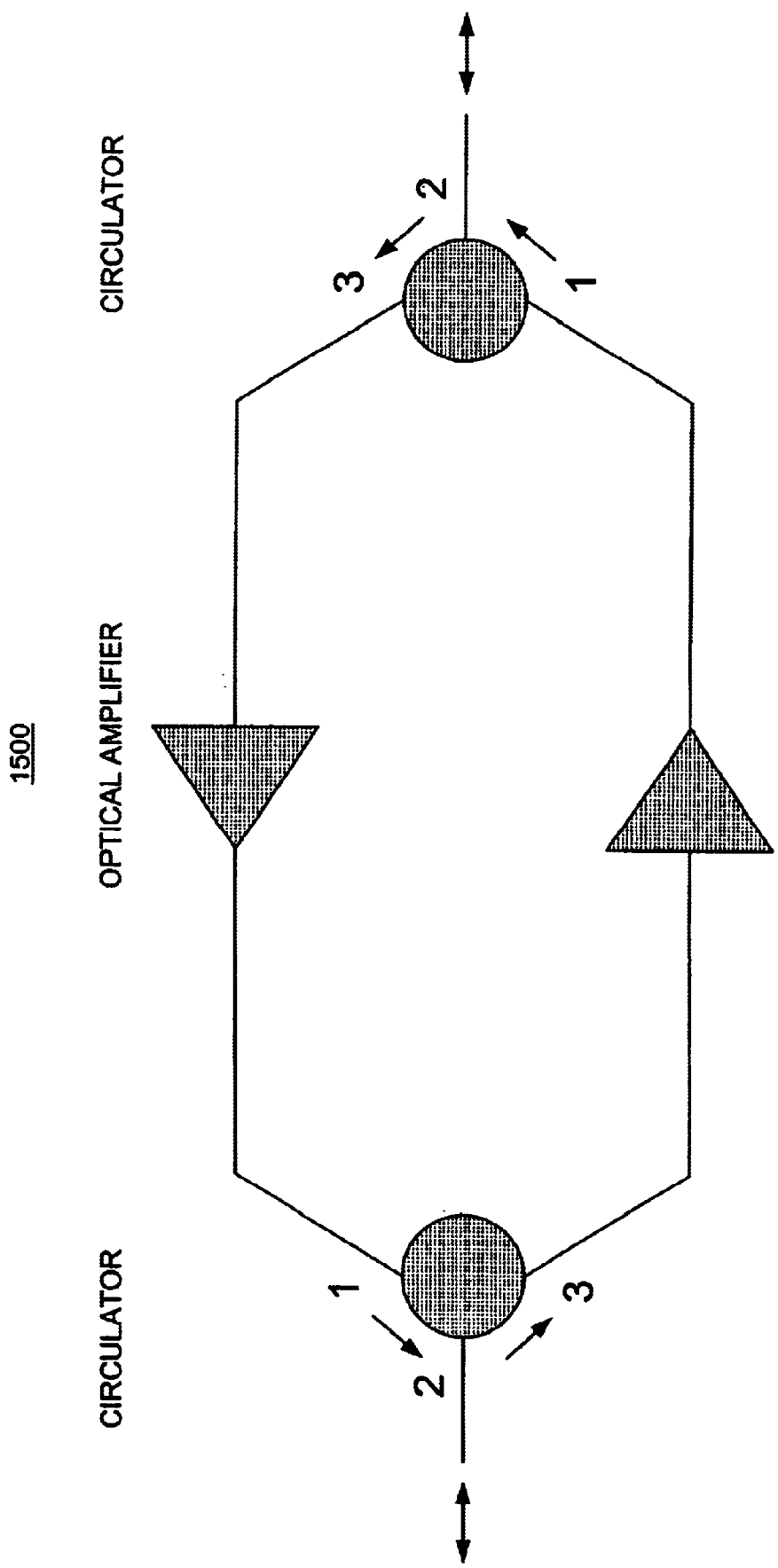
FIG. 15 shows an embodiment of a bi-directional amplifier reducing sensitivity to reflections.

A high power bi-directional amplifier can be sensitive to reflections. FIG. 15 shows bi-directional amplifier 1500. Sensitivity to reflections in the bi-directional amplifier can be reduced with unidirectional amplifiers coupled to circulators. The circulators in particular transmit light from port 1 to port 2, from port 2 to port 3. No other couplings occur in one embodiment. For a bi-directional system, a signal coming in from the left side can be split to go down the bottom path and amplified in the bottom path, and a signal coming in from the right side can be split to go down the top path and amplified in the top path. The circulators can do this splitting, and provide isolation for the amplifiers.

Figure 16:
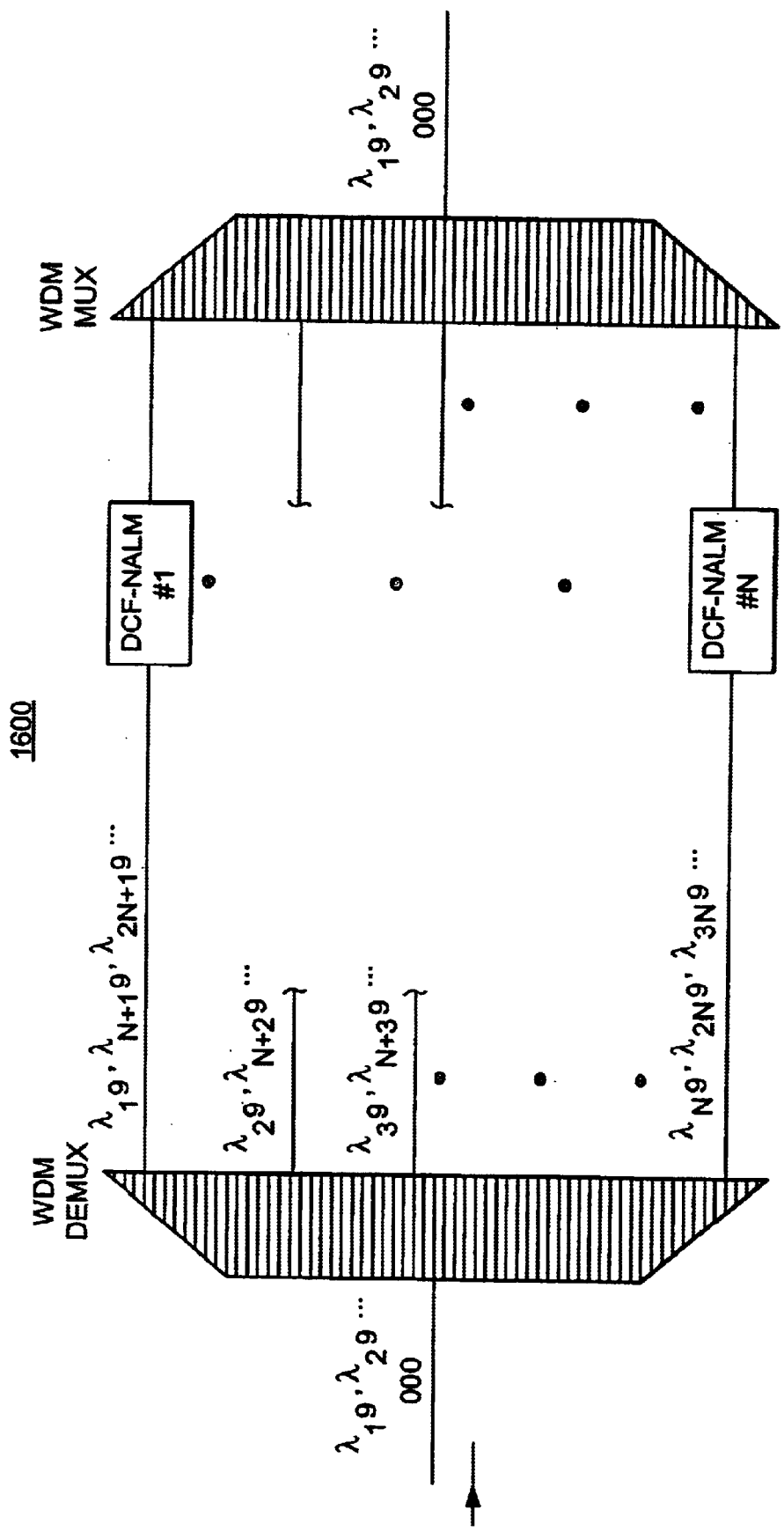
FIG. 16 shows an embodiment accommodating closer channel spacing.

FIG. 16 shows a system 1600. Channel spacings can be accommodated closer than a DCF NALM alone. The DCF NALM can have a channel spacing of about 2 nm for enough wavelength separation to have enough walk-off within the DCF to avoid cross-talk between channels. Channels can be spaced by 0.8 nm (100 GHz), 0.4 nm (50 GHz), or even closer. Channels can be demultiplexed so that on any given line, the adjacent channels may be no closer than 2 nm. Each line can have a series of wavelengths going through a parallel combination of DCF NALMs. For example, given a channel spacing of 0.4 nm and a minimal 2 nm separation between channels, 5 DCF NALMs in parallel can handle the channels. Each channel can be demultiplexed into 5 different lines.

There can be sensitivity to different data formats. Simulations were done with non-return-to-zero (NRZ), return-to-zero (RZ), and soliton formats. To first order the DCF NALM operation depends on pulse intensity. Different formats can have a switching energy proportional to the data duty cycle. For example, an NRZ signal can have a 100% duty cycle, an RZ signal can have a 50% duty cycle, and a soliton can have a 20% duty cycle. Switching energy, for example, for NRZ can be about 5 times that required for the soliton. NRZ format can require more power. NRZ format can have less pulse distortion.

DCF NALM can work at various power levels. DCF NALM can be compatible with existing systems. Input power to an amplifier stage can be in the range of −10 to −11 dBm in an OC-192 system. Input power can be consistent with operation of the DCF NALM.

One embodiment includes an OC-192 NRZ format system. This embodiment includes 13.5 km of dispersion compensating fiber. 80 km of SMF-28 can be compensated. An OC-192 signal had NRZ format. One embodiment has square pulses of 100 ps duration. A bi-directional EDFA had 30 dB of gain. One embodiment with the DCF fiber had 0.45 dB/km loss in 13.5 km fiber. One embodiment with the polarization controller had a 3 dB loss. The input power required for switching can be on the order of about −11 dBm, which can correspond to 0.08 mW per channel. A minimum channel spacing can be about 2 nm. Power from the amplifier can be about 16 dBm, or 40 mW per channel, in the clockwise direction. Net output power from the embodiment can be about 9.1 dBm, or 8.1 mW per channel. Input power can be consistent with a typical OC-192 system.

Figure 17:
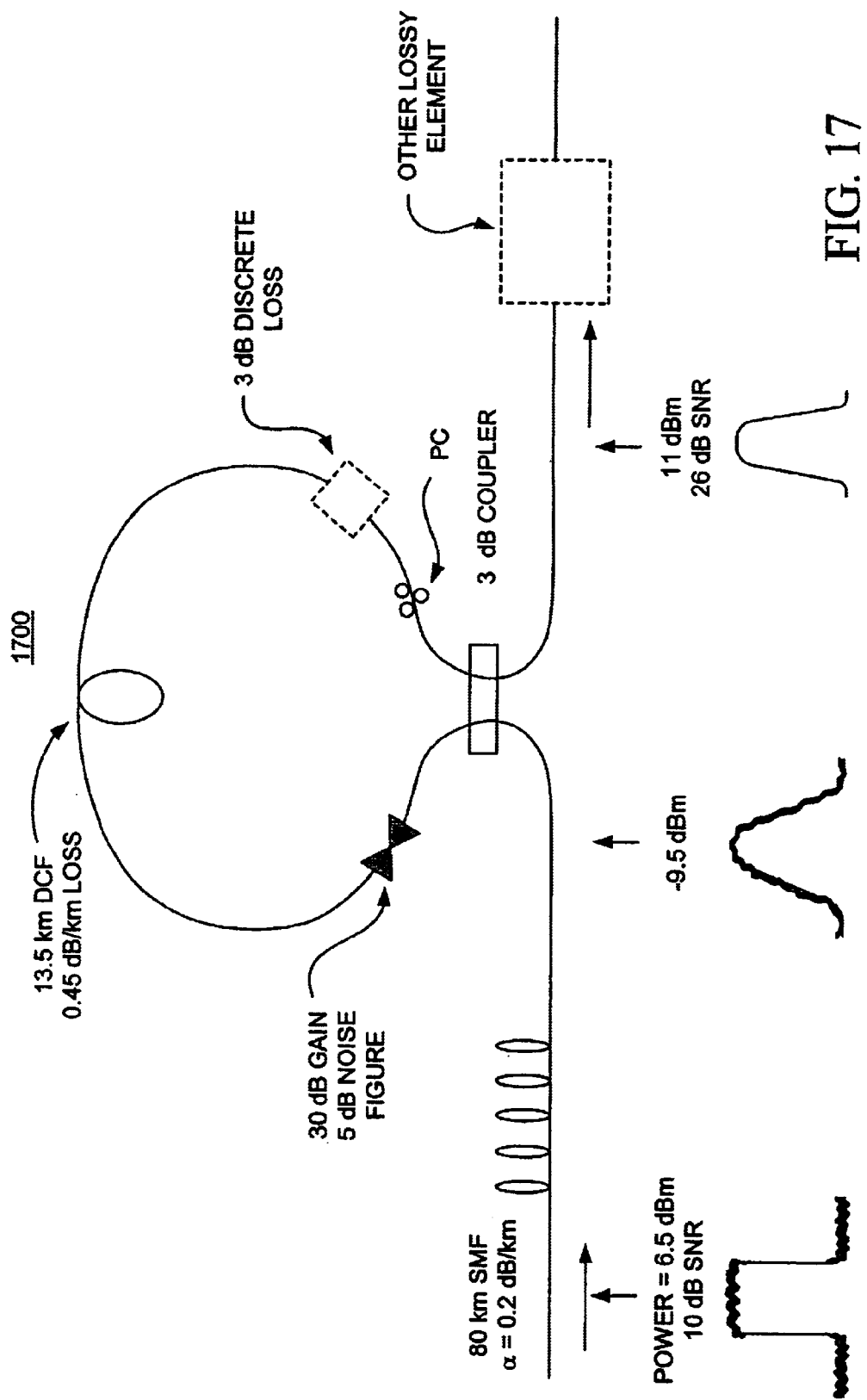
FIG. 17 shows an embodiment of a transmission link simulation.

FIG. 17 shows a system 1700. SNR can be improved. In one embodiment of a transmission link, a simulation launched a signal with 10 dB signal-to-noise ratio. A power of 6.5 dBm allowed propagation through 80 km of single mode fiber with a loss of 0.2 dB/km. At the ingress point to the SNR booster, a noisy signal has a 10 dB SNR and an input power level of −9.5 dBm. One embodiment of the optical sweeper included a 3 dB discrete loss, a 30 dB amplifier assumed to have a 5 dB noise figure, and 13.5 km of DCF assumed to have 0.45 dB/km loss. A signal with a strength of 11 dBm and SNR of about 26 dB can come out at the output end. Amplification and an improvement in signal-to-noise ratio can result, in this embodiment by about 16 dB.

Figure 18A:
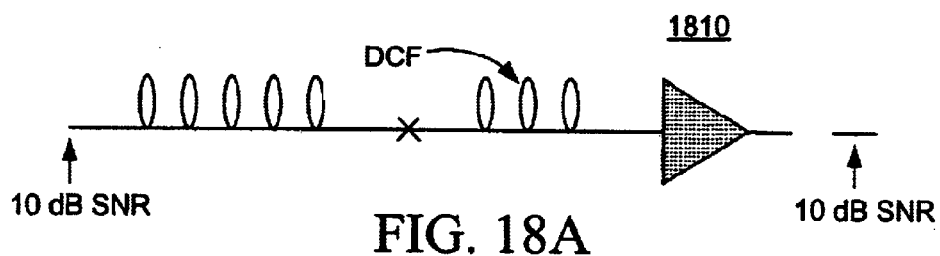
FIGS. 18 (a)–(c) shows embodiments comparing the configurations.
Figure 18B:
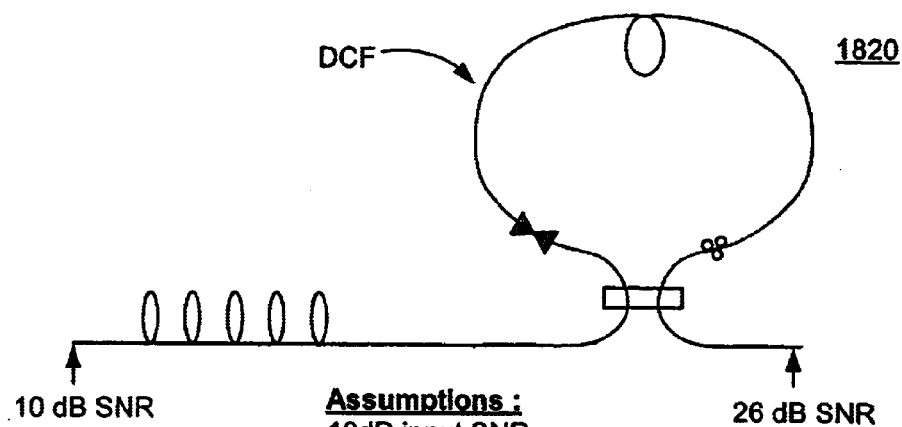
Figure 18C:
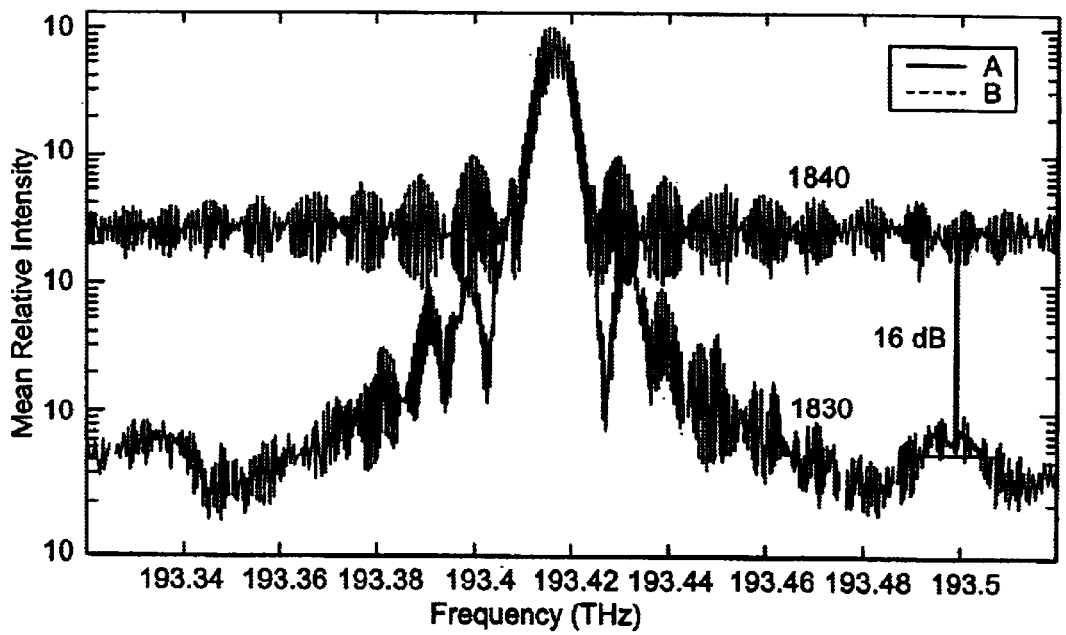

A comparison can be made with an embodiment lacking the loop and/or the optical sweeper. FIG. 18 shows two configurations being simulated. 1810 of FIG. 18(*a*) can include a standard system having an amplifier and a dispersion compensating fiber. 1820 of FIG. 18(*b*) can include the optical sweeper. Curve 1840 of FIG. 18(*c*) can correspond to configuration 1810. Curve 1830 can correspond to configuration 1820 having the SNR booster. An improvement of about 16 dB can result with the optical sweeper.

To maximize throughput of the embodiment, power level can give rise to, for example, roughly a π phase shift. The power level can be such as to create constructive interference. The phase shift from self phase modulation can be given by:

$$\Delta\Phi = (2\pi/\lambda) L_{TOT} (n_2/A_{\mathit{eff}}) P^{IN} G$$

Interaction between WDM channels through cross phase modulation can be minimized. The change in phase due to interference from cross phase modulation can be less than, for example, π/4. The phase shift from cross phase modulation can be given by:

$$\Delta\Phi_{INT} = (2\pi/\lambda) L_{w0} (2 n_2 / A_{\mathit{eff}}) P^{IN} G$$

The equations above can be similar. The cross phase modulation nonlinearity between two wavelength channels can be twice as large as the self phase modulation coefficient. In the throughput case, the length can be the total length. The length in the interaction case can be the walk-off length. Combining these two formulas the total length of the embodiment can be greater than about 8 walk-off lengths.

$$L_{TOT}/L_{w0} > 8$$

To minimize pulse distortions, the total length be less than a dispersive length. The dispersive length can be the soliton period or $Z_0$. To minimize pulse distortions, the total length can be less than about two dispersive lengths, or $2Z_0$. These criteria can be met with DCF in the loop.

$$Z_0 = \pi^2 c t_c^2 / (\lambda^2 D)$$

$$L_{TOT}/Z_0 < 2$$

Table 1 shows characteristic lengths for a 10 Gb/s NRZ signal for some embodiments. The first column can be for DCF, the second column an be for standard fiber such as SMF-28, and the third column can be for dispersion shifted fiber assumed in this example to have a dispersion of about 1 ps/(nm km). The walk-off length, the soliton period, and the total length can be shown. A 13.5 km length embodiment is described.

Two criteria can be given in the last two lines. For a 10 Gb/s signal, the dispersion compensating fiber performs well.

TABLE 1

Characteristic Lengths for 10 Gb/s NRZ Signals

|  | DCF (D = −95 ps/nm.km) | SMF-28 (D = 16 ps/nm.km) | DSF (D = 1 ps/nm.km) |
| --- | --- | --- | --- |
| $L_{wo}$ (km) (2 nm spacing) | 1.05 | 6.25 | 100.00 |
| $Z_0$ (km) (100 ps bit period) | 129.6 | 769.5 | 12324.2 |
| $L_{TOT}$ (km) | 13.5 | 13.5 | 13.5 |
| $L_{TOT}/Z_0$ | 0.08 | 0.46 | 7.41 |
| $L_{TOT}/L_{wo}$ | 9.6 | 57.0 | 912.9 |

A higher bit rate can be shown. Table 2 shows characteristic lengths for a 40 Gb/s signal using three types of fiber. At higher bit rates the bit period shrinks. With sufficient dispersion, DCF or standard fiber (SMF-28) perform well.

TABLE 2

Characteristic Lengths for 40 Gb/s NRZ Signals

|  | DCF (D = −95 ps/nm.km) | SMF-28 (D = 16 ps/nm.km) | DSF (D = 1 ps/nm.km) |
| --- | --- | --- | --- |
| $L_{wo}$ (km) (2 nm spacing) | 0.26 | 1.56 | 25.00 |
| $Z_0$ (km) (25 ps bit period) | 8.1 | 48.1 | 245.4 |
| $L_{TOT}$ (km) | 13.5 | 13.5 | 13.5 |
| $L_{TOT}/Z_0$ | 0.02 | 0.12 | 7.41 |
| $L_{TOT}/L_{wo}$ | 0.6 | 3.6 | 57.1 |

One embodiment includes a Sagnac interferometer. The relationship between the walk-off length, dispersive length, and total fiber length can be satisfactory. One embodiment includes a loop and can use dispersion compensating fiber. One embodiment can simultaneously amplify, dispersion compensate, and boost the signal-to-noise ratio.

One embodiment includes an optical sweeper. One embodiment includes a reconfiguration of a current amplifier node. One embodiment includes a two-stage amplifier with dispersion compensating fiber in mid-stage access. One embodiment can include the DCF wrapped around the amplifier, and further include a coupler, isolator, and/or polarization controller.

One systems embodiment of an ultra-long reach WDM system can periodically insert the SNR booster and/or split wavelengths to avoid interaction. A channel spacing less than, for example, 2 nm, is analogous to splitting up into multiple lines of a highway. The SNR booster can be placed at amplifier huts. Periodicity can determine the reach of the system. Various embodiments can be included in a long-distance system, metropolitan area networks, metro systems, router based systems, and/or switching systems.

The DCF based NALM can satisfy many requirements for the optical sweeper. In one embodiment, the polarization controller in the loop mirror does not limit the bandwidth. One embodiment has at least 50 nm bandwidth, which can be broader than the bandwidth of most amplifiers.

Various embodiments can use the NRZ format, RZ, and/or solitons. 25 The power levels can depend on duty cycle. For NRZ, the power level of the input for a 10 Gb/s system can be −11 dBm, similar to some WDM systems. A transmission link simulation can show a boosting of SNR by about 16 dB. Optical sweeper design can have rules of thumb.

Wrapping the DCF around the amplifier can provide for simultaneous amplification, dispersion compensation, and boosting of the SNR. One embodiment applies to legacy systems as well as new-build systems or green-field systems.

Figure 19:
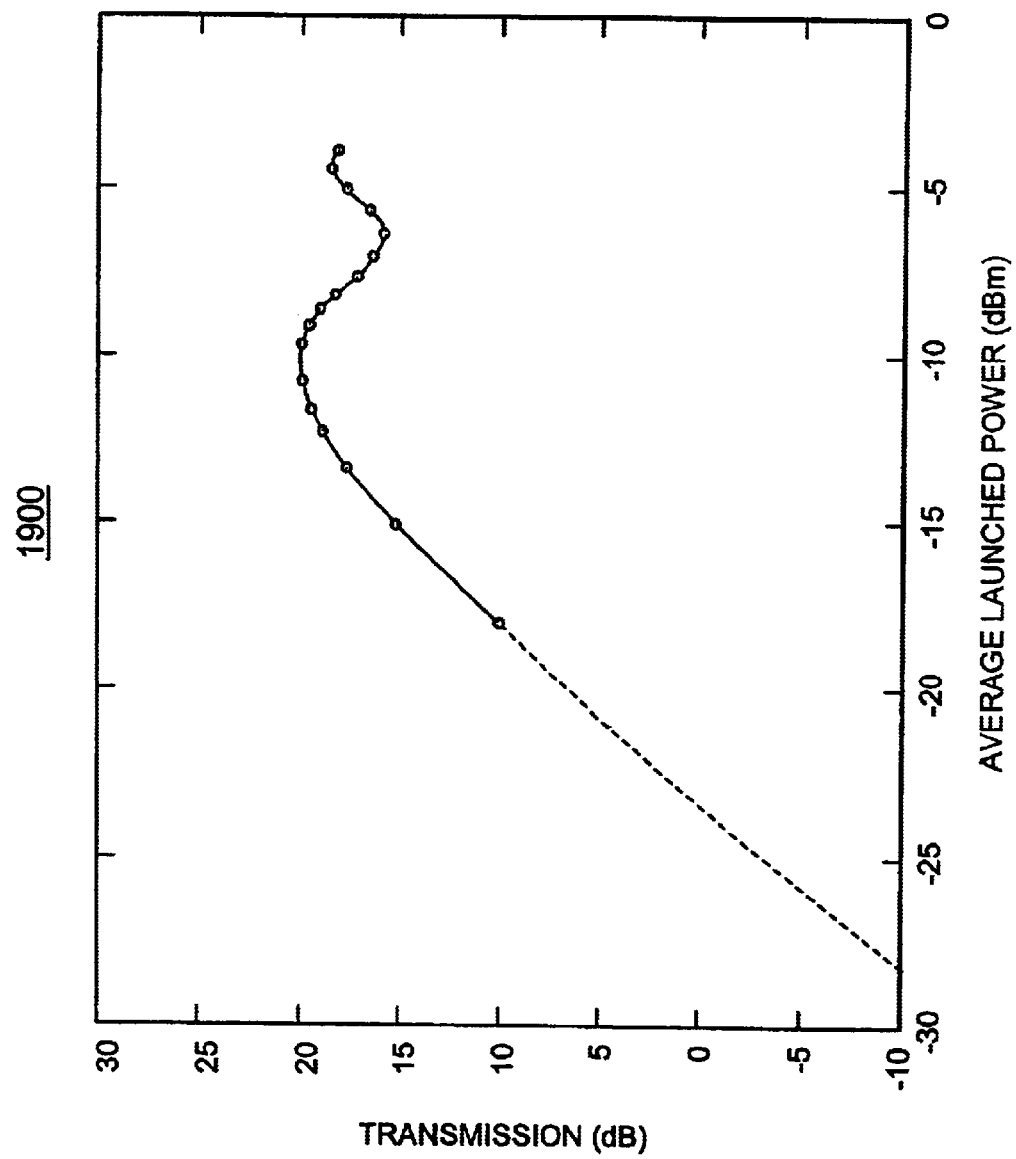
FIG. 19 is a graph illustrating one embodiment of intensity dependent transmission of DCF/NALM.
Figure 20:
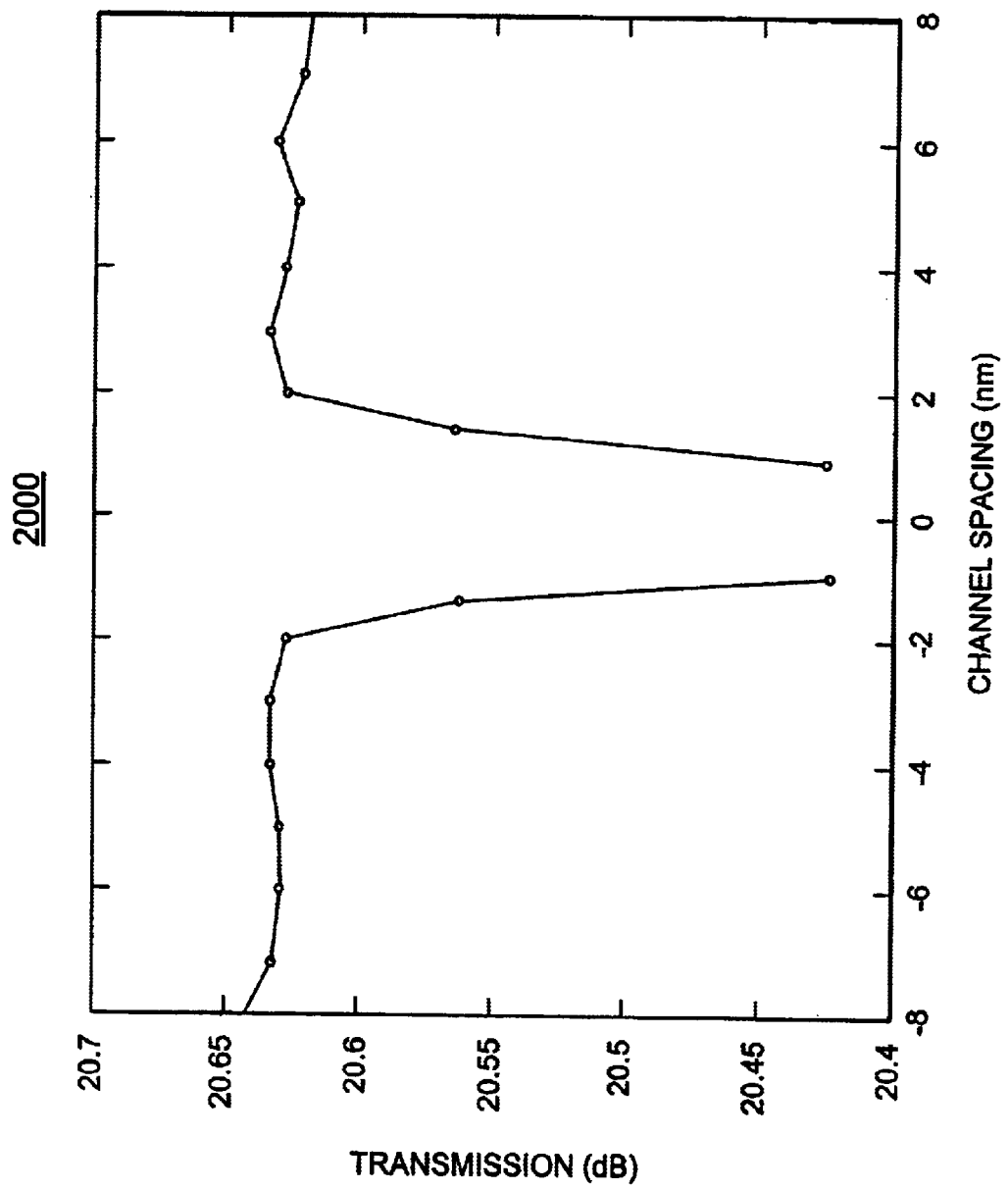
FIG. 20 is a graph illustrating one embodiment of an interchannel cross-talk for nearest neighbor WDM channels.
Figure 21:
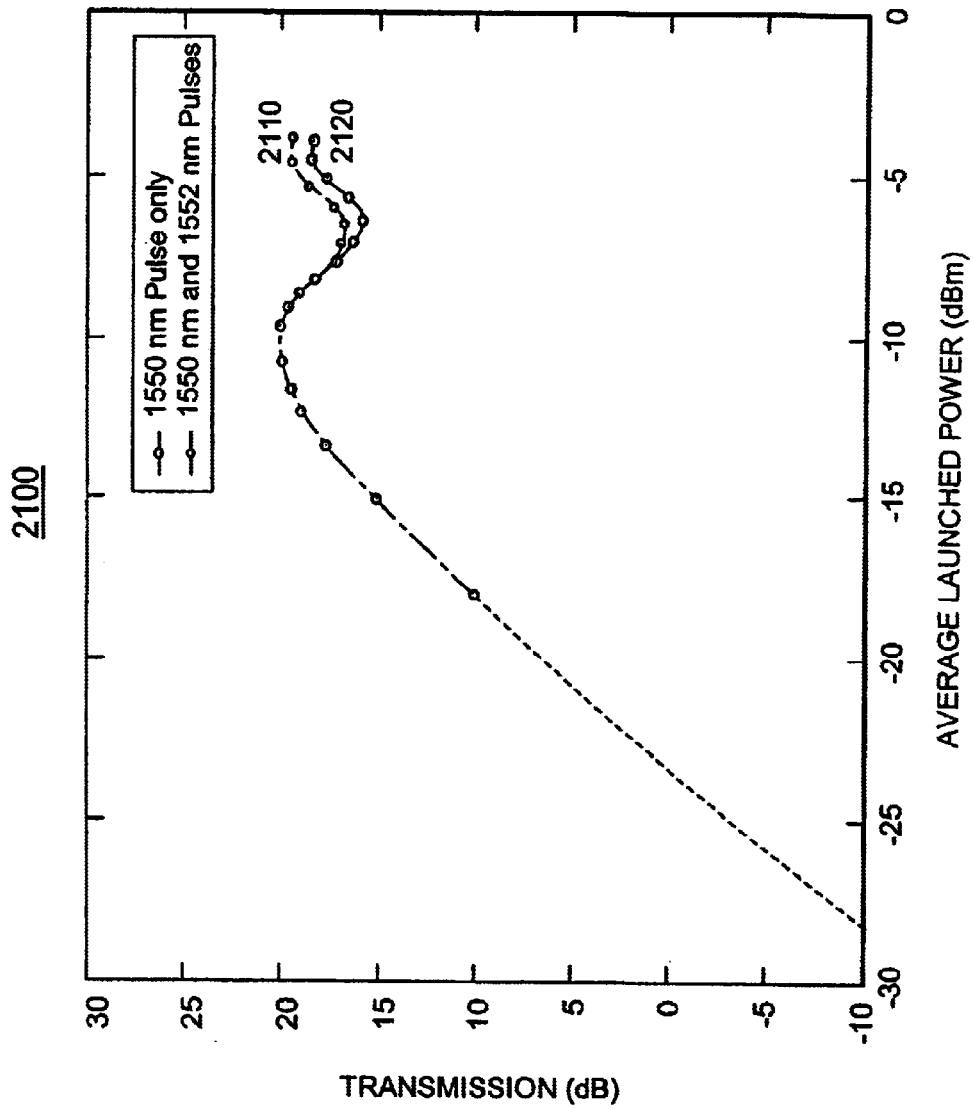
FIG. 21 is a graph illustrating one embodiment of a nonlinerar transmission for two channels separated by 3 nm.

FIGS. 19, 20, and 21 show results simulations. FIG. 19 shows the transmission of the DCF NALM versus input power. In this simulation 5 13.5 km length of DCF fiber with 0.45 dB/km loss was included. 80 km of standard fiber (SMF-28) can be effectively compensated. An OC-192 signal and NRZ format corresponded to square pulses of 100 ps duration. The wavelength was 1550 nm. A bi-directional EDFA has 30 dB of gain and the polarization controller has 3 dB discrete loss.

Curve 1900 shows that the transmission for weak power levels can be much lower than that for signals with a power level near −11 dBm. Noise can have a lower intensity than the signal. Noise transmission through the DCF NALM can be smaller than signal transmission. The noise can be effectively filtered from the output. The DCF NALM can be an intensity dependent switch.

Input power required for maximum throughput can be on the order of about −11 dBm, which can correspond to 0.08 mW per channel. At this input power level, the power from the amplifier can be about 16 dBm, or 40 mW per channel, in the clockwise direction, and the net output power from the embodiment can be about 9.1 dBm, or 8.1 mW per channel. The input power can be consistent with a typical OC-192 system.

Performance can change when other channels can be added. FIG. 20 shows curve 2000, the transmission versus channel separation with two channels. The wavelength of one channel can be fixed at 1550 nm, and the wavelength of the second channel can be varied. The curve 2000 shows slight changes in transmission when the channel separation can be larger than about 2 nm. A minimum channel spacing of about 2 nm can minimize interaction between channels FIG. 21 shows curve 2120, the transmission of the DCF NALM versus input power with two channels. Curve 2110 shows one channel. Curve 2120 can correspond to the case with one channel at a wavelength of 1550 nm. Curve 2110 can correspond to the case with two channels having a spacing of 2 nm, one at 1550 nm and a second at 1552 nm. The transmission at 1550 nm can be plotted versus input power. Curves 2110 and 2120 show that transmission in the case with two channels can be similar to that with only one channel. The peak transmission for each case can occur at nearly the same input power, about −11 dBm. The transmission at that input level for the two cases can be similar. Adding another channel may not change performance very much for wavelengths separated by about 2 nm. Some embodiments can be used for multiple wavelengths simultaneously.

One embodiment of a non-linear optical loop mirror for processing optical signals can include an optical fiber, a bi-directional amplifier, and a coupler. The optical fiber can include a signal input and a signal output. At least a portion of the optical fiber can include a dispersion compensating fiber. At least a portion of the optical fiber can form a loop. The fiber loop can have a first end and a second end and the bi-directional amplifier can be positioned closer to one of the first and second ends. The fiber loop can include at least eight walk-off lengths. The dispersion compensating fiber can have an absolute magnitude of dispersion of at least 20 ps/nm-km, or of at least 50 ps/nm-km, for at least a portion of wavelengths in the optical signals. At least a portion of the dispersion compensating fiber can have an absolute magnitude of dispersion of at least 20 ps/nm-km, for a majority of wavelengths in the optical signals. The dispersion compensating fiber can have a nonlinear coefficient greater than 2 $W-1$ $km-1$, or greater than 3 $W-1$ $km-1$. The dispersion compensating fiber can have a sufficiently large dispersion to minimize phase shift interactions between adjacent wavelength signals of the optical signals. The phase shift from cross phase modulation between adjacent wavelengths in the optical signals may be no more than ¼ of a phase shift from self phase modulation of one of the adjacent wavelengths. The bi-directional amplifier can be coupled to the optical fiber. The bi-directional amplifier can be a rare earth doped amplifier, an erbium-doped fiber amplifier, and/or a Raman amplifier. The coupler can be coupled to a first portion of the optical fiber and a second portion of the optical fiber to form a fiber loop. The coupler can split a power of the optical signals with a first portion and a second portion. The first portion of the optical signals travels in a first direction in the fiber loop. The second portion of optical signals travels in a counter-propagating direction in the fiber loop. The coupler can provide substantially equal coupling in the two directions. The embodiment can further include a polarization controller coupled to the fiber loop. The polarization controller can align polarizations of the optical signals of the two directions when the optical signals recombine in the fiber loop. The embodiment can further include a lossy element coupled to the fiber loop. The lossy member can be selected from an add/drop multiplexer, a gain equalizer and a dispersion compensating element. The embodiment can provide simultaneous amplification and dispersion compensation of an optical signal. The embodiment can provide simultaneous amplification, dispersion compensation and boosting of signal to noise ratio of an optical signal.

One embodiment of a non-linear optical loop mirror for processing optical signals can include a first optical fiber, a second optical fiber, a bi-directional amplifier, and a coupler. The first optical fiber can include a signal input and a signal output. The second optical fiber can be coupled to the first optical fiber to form a fiber loop. The fiber loop can include at least eight walk-off lengths. The fiber loop can have a first end and a second end. The bi-directional amplifier can be positioned closer to one of the first and second ends. At least a portion of the second optical fiber can include a dispersion compensating fiber that can have an absolute magnitude of dispersion of at least 20 ps/nm-km for at least a portion of wavelengths in the optical signals. The dispersion compensating fiber can have an absolute magnitude of dispersion of at least 20 ps/nm-km, or at least 50 ps/nm-km, for at least a portion of wavelengths in the signal. The dispersion compensating fiber can have a nonlinear coefficient greater than 2 $W-1$ $km-1$, or greater than 3 $W-1$ $km-1$. The dispersion compensating fiber can have a sufficiently large dispersion to minimize phase shift interactions between adjacent wavelength signals of the optical signals. The phase shift from cross phase modulation between adjacent wavelengths in the optical signals may be no more than ¼ of a phase shift from self phase modulation of one of the adjacent wavelengths. The bi-directional amplifier can be coupled to at least one of the first and second optical fibers. The bi-directional amplifier can be a rare earth doped amplifier, an erbium-doped fiber amplifier, or a Raman amplifier. The bi-directional amplifier can provide a gain to the optical signals of at least 10 dB. The coupler can be coupled to the first and second optical fibers. The coupler can split a power of an optical signal with a first portion and a second portion. The first portion travels in a first direction in the fiber loop. The second portion travels in a counter-propagating direction in the fiber loop. The coupler can provide substantially equal coupling in the two directions.

The embodiment can further include a polarization controller coupled to the fiber loop. The polarization controller can align polarizations of the optical signals of the two directions when the optical signals recombine in the fiber loop. The embodiment can further include a lossy element coupled to the fiber loop. The lossy member can be selected from an add/drop multiplexer, a gain equalizer and a dispersion compensating element. The embodiment can provide simultaneous amplification and dispersion compensation of an optical signal. The embodiment can provide simultaneous amplification, dispersion compensation and boosting of signal to noise ratio of an optical signal.

One embodiment of a method of processing optical signals can include providing a non-linear optical loop mirror that includes a dispersion compensating fiber and a fiber loop, the dispersion compensating fiber having an absolute magnitude of dispersion of at least 20 ps/nm-km for at least a portion of wavelengths in the optical signals; introducing the optical signal to the non-linear optical loop mirror; and simultaneously amplifying and dispersion compensating the optical signal in the non-linear optical loop mirror. The embodiment can further include simultaneously amplifying, dispersion compensating and boosting the signal to noise ratio of the optical signal in the non-linear optical loop mirror. The embodiment can further include splitting a power of an optical signal in the non-linear optical mirror with a first portion traveling in a first direction in the fiber loop and a second portion traveling in a counter-propagating direction in the fiber loop. At least a portion of the dispersion compensating fiber can have an absolute magnitude of dispersion of at least 20 ps/nm-km, or of at least 50 ps/nm-km, for at least a portion of wavelengths in the signal. The embodiment can further include providing substantially equal coupling of the first and second portion in the two directions. The embodiment can further include aligning polarizations of the optical signal of the two directions when recombined in the fiber loop. The dispersion compensating fiber can have a sufficiently large dispersion to minimize phase shift interactions between adjacent wavelength signals of the optical signals. The phase shift from cross phase modulation between adjacent wavelengths in the optical signals may be no more than ¼ of a phase shift from self phase modulation of one of the adjacent wavelengths. The fiber loop can include at least eight walk-off lengths. The embodiment can further include providing gain to the optical signal of at least 10 dB.

One embodiment of a non-linear optical loop mirror for processing optical signals can include an optical fiber, a bi-directional amplifier, and a coupler. The optical fiber can include a signal input, a signal output, and a fiber loop. At least a portion of the optical fiber can include a sufficiently large dispersion to minimize phase shift interactions between adjacent wavelength signals of the optical signals. At least a portion of the optical fiber can form a fiber loop. The bi-directional amplifier can be coupled to the optical fiber. The coupler can be coupled to the fiber loop. The phase shift from cross phase modulation between adjacent wavelengths in the optical signals may be no more than ¼ of a phase shift from self phase modulation of one of the adjacent wavelengths.

One embodiment of an optical regeneration system can include a wavelength demultiplexer, a wavelength multiplexer, and a plurality of nonlinear optical loop mirrors. Each of the plurality of nonlinear optical loop mirrors can include a first fiber, a second fiber, a coupler, and a first optical amplifier. At least a portion of the optical fiber can have an absolute magnitude of dispersion of at least 20 ps/nm-km, or at least 50 ps/nm-km, for at least a portion of wavelengths in the signal. The optical fiber can have a nonlinear coefficient greater than 2 W−1km−1, or greater than 3 W−1 km−1. The first fiber can include a first end, a second end, and a first effective nonlinearity. The first effective nonlinearity can be determined at least by an index of refraction of the first fiber and an effective area of the first fiber. The second fiber can include a first end, a second end, and a second effective nonlinearity determined at least by an index of refraction of the second fiber and an effective area of the second fiber. The first effective nonlinearity can be distinct from the second effective nonlinearity. The coupler can be coupled to the first end of the first fiber, the first end of the second fiber, the wavelength demultiplexer, and the wavelength multiplexer. The fiber loop can include at least eight walk-off lengths. The fiber loop can have a first end and a second end. The bi-directional amplifier can be positioned closer to one of the first and second ends. The bi-directional amplifier can be a rare earth doped amplifier, an erbium-doped fiber amplifier, and a Raman amplifier. The coupler can split a power of an optical signal with a first portion traveling in a first direction in the fiber loop and a second portion traveling in a counter-propagating direction in the fiber loop. The coupler can split a power of the optical signals with a first portion of the optical signals traveling in a first direction in the fiber loop and a second portion of optical signals traveling in a counter-propagating direction in the fiber loop. The coupler can provide substantially equal coupling in the two directions. The first optical amplifier can be coupled to the second end of the first fiber and the second end of the second fiber. The first optical amplifier amplifies at least signals traveling in a first direction from the second end of the first fiber to the second end of the second fiber and signals traveling in a second direction from the second end of the second fiber to the second end of the first fiber. The phase shift from cross phase modulation between adjacent wavelengths in the optical signals may be no more than ¼ of a phase shift from self phase modulation of one of the adjacent wavelengths. The embodiment can further include a polarization controller. The polarization controller can be coupled to the fiber loop. The polarization controller can align polarizations of the optical signals of the two directions when the optical signals recombine in the fiber loop. The embodiment can further include a lossy element coupled to the fiber loop. The lossy member can be selected from an add/drop multiplexer, a gain equalizer and a dispersion compensating element. The embodiment can provide simultaneous amplification and dispersion compensation of an optical signal. The embodiment can provide simultaneous amplification, dispersion compensation and boosting of signal to noise ratio of an optical signal. The embodiment can provide a bi-directional amplifier gain of at least 10 dB.

One embodiment of an optical system for processing optical signal, can include an input optical fiber, a splitter, and at least a first loop mirror. The splitter can be coupled to the input optical fiber. The splitter separates adjacent channels of an input optical signal. At least a first loop mirror can be coupled to the splitter. At least a first loop mirror includes a fiber loop. The fiber loop can include at least eight walk-off lengths. The fiber loop can have a first end and a second end. A bi-directional amplifier can be positioned closer to one of the first and second ends. The bi-directional amplifier can be a rare earth doped amplifier, an erbium-doped fiber amplifier, and a Raman amplifier. The bi-directional amplifier can provide a gain to the optical signals of at least 10 dB. At least a portion of the fiber loop includes a dispersion compensating fiber. At least a portion of the dispersion compensating fiber can have an absolute magnitude of dispersion of 20 ps/nm-km for at least a portion of wavelengths in the optical signals. At least a portion of the dispersion compensating fiber can have an absolute magnitude of dispersion of at least 50 ps/nm-km for at least a portion of wavelengths in the optical signals. The dispersion compensating fiber can have a nonlinear coefficient greater than 2 W−1 km−1, or greater than 3 W−1 km−1. The dispersion compensating fiber can have a sufficiently large dispersion to minimize phase shift interactions between adjacent wavelength signals of the optical signals. The phase shift from cross phase modulation between adjacent wavelengths in the optical signals may be no more than ¼ of a phase shift from self phase modulation of one of the adjacent wavelengths. Alternative embodiments include loop mirror of another embodiment. The embodiment can further include a combiner coupled to the at least first loop mirror. The embodiment can further include at least one output fiber coupled to the combiner. The embodiment can further include a coupler. The coupler can split a power of the optical signals with a first portion of the optical signals traveling in a first direction in the fiber loop and a second portion of optical signals traveling in a counter-propagating direction in the fiber loop. The coupler can provide substantially equal coupling in the two directions. The embodiment can further include a polarization controller. The polarization controller can be coupled to the fiber loop. The polarization controller can align polarizations of the optical signals of the two directions when the optical signals recombine in the fiber loop. The embodiment can further include a lossy element coupled to the fiber loop. The lossy member can be selected from an add/drop multiplexer, a gain equalizer and a dispersion compensating element. The embodiment can provide simultaneous amplification and dispersion compensation of an optical signal. The embodiment can provide simultaneous amplification, dispersion compensation and boosting of signal to noise ratio of an optical signal.

One embodiment of a non-linear optical loop mirror can include a first optical fiber, a second optical fiber, and a coupler. The first optical fiber can include a first effective non-linearity. The first effective non-linearity can be directly proportional to a non-linear index of refraction of the first optical fiber and inversely proportion to an effective area of the first optical fiber. A length of the first optical fiber can be greater than a walk-off length for at least a portion of adjacent wavelengths propagating in the first fiber. The second optical fiber can be coupled to the first optical fiber and can form a fiber loop. The second optical fiber can include a second effective non-linearity that can be different from the first effective non-linearity. The second effective non-linearity can be directly proportional to a non-linear index of refraction of the second optical fiber and inversely proportion to an effective area of the second optical fiber. A difference between the first and second effective non-linearities can be greater than 20% of at least one of the first and second effective non-linearities. A length of the second fiber can be greater than a walk-off length for at least a portion of adjacent wavelengths propagating in the second fiber. At least one of the first and second optical fibers has a length of at least 100 m. At least one of the first and second optical fibers can have a sufficiently large dispersion to minimize phase shift interactions between adjacent wavelength signals of the optical signals. The phase shift from cross phase modulation between adjacent wavelengths in the optical signals may be no more than ¼ of a phase shift from self phase modulation of one of the adjacent wavelengths. The first and second optical fibers can have different dispersions. At least a portion of one of the first and second optical fibers can be a dispersion compensating fiber. The dispersion compensating fiber can have an absolute magnitude of dispersion of at least 20 ps/nm-km, or at least 50 ps/nm-km, for at least a portion of wavelengths in the signal. The dispersion compensating fiber can have a nonlinear coefficient greater than 2 W−1 km−1, or greater than 3 W−1 km−1. The coupler can be coupled to the first and second optical fibers. The coupler can split a power of an optical signal with a first portion traveling in a first direction in the fiber loop and a second portion traveling in a counter-propagating direction in the fiber loop. The coupler can provide substantially equal coupling in the two directions. The embodiment can further include a polarization controller. The polarization controller can be coupled to the fiber loop. The polarization controller can align polarizations of the optical signals of the two directions when the optical signals recombine in the fiber loop. The embodiment can further include a lossy element coupled to the fiber loop. The lossy member can be selected from an add/drop multiplexer, a gain equalizer and a dispersion compensating element. The embodiment can provide simultaneous dispersion compensation and boosting of signal to noise ratio of an optical signal.

One embodiment of a non-linear optical loop mirror can include a first optical fiber, a second optical fiber, bi-directional amplifier, and a coupler. The first optical fiber can include a first effective non-linearity. The first effective non-linearity can be directly proportional to a non-linear index of refraction of the first optical fiber and inversely proportion to an effective area of the first optical fiber. A length of the first optical fiber can be greater than a walk-off length for at least a portion of adjacent wavelengths propagating in the first fiber. The second optical fiber can be coupled to the first optical fiber and can form a fiber loop. The second optical fiber can include a second effective non-linearity that can be different from the first effective non-linearity. The second effective non-linearity can be directly proportional to a non-linear index of refraction of the second optical fiber and inversely proportion to an effective area of the second optical fiber. A difference between the first and second effective non-linearities can be greater than 20% of at least one of the first and second effective non-linearities. A length of the second fiber can be greater than a walk-off length for at least a portion of adjacent wavelengths propagating in the second fiber. At least one of the first and second optical fibers has a length of at least 100 m. At least one of the first and second optical fibers can have a sufficiently large dispersion to minimize phase shift interactions between adjacent wavelength signals of the optical signals. The phase shift from cross phase modulation between adjacent wavelengths in the optical signals may be no more than ¼ of a phase shift from self phase modulation of one of the adjacent wavelengths. The first and second optical fibers can have different dispersions. At least a portion of one of the first and second optical fibers can be a dispersion compensating fiber. The dispersion compensating fiber can have an absolute magnitude of dispersion of at least 20 ps/nm-km, or at least 50 ps/nm-km, for at least a portion of wavelengths in the signal. The dispersion compensating fiber can have a nonlinear coefficient greater than 2 W−1 km−1, or greater than 3 W−1 km−1. The bi-directional amplifier can be coupled to at least one of the first and second optical fibers. The bi-directional amplifier can be coupled to each of the first and second optical fibers. The bi-directional amplifier can be positioned substantially at a midpoint of the fiber. The bi-directional amplifier can be a rare earth doped amplifier, an erbium-doped fiber amplifier, and a Raman amplifier. The bi-directional amplifier can provide a gain to the optical signals of at least 10 dB. The coupler can be coupled to the first and second optical fibers. The coupler can split a power of an optical signal with a first portion traveling in a first direction in the fiber loop and a second portion traveling in a counter-propagating direction in the fiber loop. The coupler can provide substantially equal coupling in the two directions. The embodiment can further include a polarization controller. The polarization controller can be coupled to the fiber loop. The polarization controller can align polarizations of the optical signals of the two directions when the optical signals recombine in the fiber loop. The embodiment can further include a lossy element coupled to the fiber loop. The lossy member can be selected from an add/drop multiplexer, a gain equalizer and a dispersion compensating element. The embodiment can provide simultaneous amplification and dispersion compensation of an optical signal. The embodiment can provide simultaneous amplification, dispersion compensation and boosting of signal to noise ratio of an optical signal.

The foregoing description of the invention has been presented for purposes of illustration and description. It is not intended to be exhaustive or to limit the invention to the precise forms disclosed. Many modifications and variations will be apparent to those skilled in the art.

What is claimed is:

1. A non-linear optical loop mirror for processing optical signals, comprising:
    an optical fiber with a signal input and a signal output, at least a portion of the optical fiber being a dispersion compensating fiber and at least a portion of the optical fiber forming a loop, the dispersion compensating fiber having an absolute magnitude of dispersion of at least 20 ps/nm-km for at least a portion of wavelengths in the optical signals;
    a bi-directional amplifier coupled to the optical fiber; and
    a coupler coupled to a fist portion of the optical fiber and a second portion of the optical fiber to form a fiber loop.

2. The mirror of claim 1, wherein the coupler splits a power of the optical signals with a first portion of the optical signals traveling in a first direction in the fiber loop and a second portion of optical signals traveling in a counter-propagating direction in the fiber loop.

3. The mirror of claim 1, wherein at least a portion of the dispersion compensating fiber has an absolute magnitude of dispersion of at least 20 ps/nm-km for a majority of wavelengths in the optical signals.

4. The mirror of claim 1, wherein at least a portion of the dispersion compensating fiber has an absolute magnitude of dispersion of at least 50 ps/nm-km for at least a portion of wavelengths in the optical signals.

5. The mirror of claim 1, wherein the dispersion compensating fiber has a nonlinear coefficient greater than 2 $W^{-1}$ $km^{-1}$.

6. The mirror of claim 1, wherein the dispersion compensating fiber has a nonlinear coefficient greater than 3 $W^{-1}$ $km^{-1}$.

7. The mirror of claim 2, wherein the coupler provides substantially equal coupling in the two directions.

8. The mirror of claim 2, further comprising:
a polarization controller coupled to the fiber loop that aligns polarizations of the optical signals of the two directions when the optical signals recombine in the fiber loop.

9. The mirror of claim 1, further comprising: a lossy element coupled to the fiber loop.

10. The mirror of claim 9, wherein the lossy member is selected from the group consisting of an add/drop multiplexer, a gain equalizer and a dispersion compensating element.

11. The mirror of claim 1, wherein the fiber loop has a first end and a second end and the bi-directional amplifier is positioned closer to one of the first and second ends.

12. The mirror of claim 1, wherein the bi-directional amplifier is a rare earth doped amplifier.

13. The mirror of claim 1, wherein the bi-directional amplifier is an erbium-doped fiber amplifier.

14. The mirror of claim 1, wherein the bi-directional amplifier is a Raman amplifier.

15. The mirror of claim 1, wherein the dispersion compensating fiber has a sufficiently large dispersion to minimize phase shift interactions between adjacent wavelength signals of the optical signals.

16. The mirror of claim 15, wherein the phase shift from cross phase modulation between adjacent wavelengths in the optical signals is no more than ¼ of a phase shift from self phase modulation of one of the adjacent wavelengths.

17. The mirror of claim 1, wherein the fiber loop includes at least eight walk-off lengths.

18. The mirror of claim 1, wherein the mirror provides simultaneous amplification and dispersion compensation of an optical signal.

19. The mirror of claim 1, wherein the mirror provides simultaneous amplification, dispersion compensation and boosting of signal to noise ratio of an optical signal.

20. The mirror of claim 1, wherein the bi-directional amplifier provides a gain to at least some of the optical signals of at least 10 dB.

21. A non-linear optical loop mirror for processing optical signals, comprising:
a first optical fiber with a signal input and a signal output,
a second optical fiber coupled to the first optical fiber to form a fiber loop, at least a portion of the second optical fiber being a dispersion compensating fiber that has an absolute magnitude of dispersion of at least 20 ps/nm-km for at least a portion of wavelengths in the optical signals;
a bi-directional amplifier coupled to at least one of the first and second optical fibers; and
a coupler coupled to the first and second optical fiber.

22. The mirror of claim 21, wherein the coupler splits a power of an optical signal with a first portion traveling in a first direction in the fiber loop and a second portion traveling in a counter-propagating direction in the fiber loop.

23. The mirror of claim 21, wherein at least a portion of the dispersion compensating fiber has an absolute magnitude of dispersion of at least 20 ps/nm-km for a majority of wavelengths in the signal.

24. The mirror of claim 21, wherein at least a portion of the dispersion compensating fiber has an absolute magnitude of dispersion of at least 50 ps/nm-km for at least a portion of wavelengths in the signal.

25. The mirror of claim 21, wherein the dispersion compensating fiber has a nonlinear coefficient greater than 2 $W^{-1}$ $km^{-1}$.

26. The mirror of claim 21, wherein the dispersion compensating fiber has a nonlinear coefficient greater than 3 $W^{-1}$ $km^{-1}$.

27. The mirror of claim 22, wherein the coupler provides substantially equal coupling in the two directions.

28. The mirror of claim 22, further comprising:
a polarization controller coupled to the fiber loop that aligns polarizations of the optical signals of the two directions when the optical signals recombine in the fiber loop.

29. The mirror of claim 21, further comprising: a lossy element coupled to the fiber loop.

30. The mirror of claim 29, wherein the lossy member is selected from the group consisting of an add/drop multiplexer, a gain equalizer and a dispersion compensating element.

31. The mirror of claim 21, wherein the fiber loop has a first end and a second end, wherein the bi-directional amplifier is positioned closer to one of the first and second ends.

32. The mirror of claim 21, wherein the bi-directional amplifier is a rare earth doped amplifier.

33. The mirror of claim 21, wherein the bi-directional amplifier is an erbium-doped fiber amplifier.

34. The mirror of claim 21, wherein the bi-directional amplifier is a Raman amplifier.

35. The mirror of claim 21, wherein the dispersion compensating fiber has a sufficiently large dispersion to minimize phase shift interactions between adjacent wavelength signals of the optical signals.

36. The mirror of claim 35, wherein the phase shift from cross phase modulation between adjacent wavelengths in the optical signals is no more than ¼ of a phase shift from self phase modulation of one of the adjacent wavelengths.

37. The mirror of claim 21, wherein the fiber loop includes at least eight walk-off lengths.

38. The mirror of claim 21, wherein the mirror provides simultaneous amplification and dispersion compensation of an optical signal.

39. The mirror of claim 21, wherein the mirror provides simultaneous amplification, dispersion compensation and boosting of signal to noise ratio of an optical signal.

40. The mirror of claim 21, wherein the bi-directional amplifier provides a gain to the optical signals of at least 10 dB.

41. A method of processing optical signals, comprising:
providing a non-linear optical loop mirror that includes a dispersion compensating fiber and a fiber loop, the dispersion compensating fiber having an absolute magnitude of dispersion of at least 20 ps/nm-km for at least a portion of wavelengths in the optical signals;
introducing the optical signal to the non-linear optical loop mirror; simultaneously amplifying and dispersion compensating the optical signal in the non-linear optical loop mirror.

42. The method of claim 41, further comprising:
simultaneously amplifying, dispersion compensating and boosting the signal to noise ratio of the optical signal in the non-linear optical loop mirror.

43. The method of claim 41, further comprising:
splitting a power of an optical signal in the non-linear optical mirror with a first portion traveling in a first direction in the fiber loop and a second portion traveling in a counter-propagating direction in the fiber loop.

44. The method of claim 41, wherein at least a majority of the dispersion compensating fiber has an absolute magnitude of dispersion of at least 20 ps/nm-km for at least a portion of wavelengths in the signal.

45. The method of claim 41, further comprising:
wherein at least a portion of the dispersion compensating fiber has an absolute magnitude of dispersion of at least 50 ps/nm-km for at least a portion of wavelengths in the optical signal.

46. The method of claim 43, further comprising:
providing substantially equal coupling of the first and second portion in the two directions.

47. The method of claim 43, further comprising:
aligning polarizations of the optical signal of the two directions when recombined in the fiber loop.

48. The method of claim 41, further comprising:
wherein the dispersion compensating fiber has a sufficiently large dispersion to minimize phase shift interactions between adjacent wavelength signals of the optical signals.

49. The method of claim 48, wherein the phase shift from cross phase modulation between adjacent wavelengths in the optical signals is no more than ¼ of a phase shift from self phase modulation of one of the adjacent wavelengths.

50. The method of claim 41, wherein the fiber loop includes at least eight walk-off lengths.

51. The method of claim 41, further comprising: providing gain to the optical signal of at least 10 dB.

52. A non-linear optical loop mirror for processing optical signals, comprising:
an optical fiber with a signal input, a signal output and a fiber loop, at least a portion of the optical fiber having a sufficiently large dispersion to minimize phase shift interactions between adjacent wavelength signals of the optical signals, at least a portion of the optical fiber forming a fiber loop;
a bi-directional amplifier coupled to the optical fiber; and
a coupler coupled to the fiber loop.

53. The mirror of claim 52, wherein the phase shift from cross phase modulation between adjacent wavelengths in the optical signals is no more than ¼ of a phase shift from self phase modulation of one of the adjacent wavelengths.

54. An optical regeneration system, comprising:
a wavelength demultiplexer;
a wavelength multiplexer;
a plurality of nonlinear optical loop mirrors, each comprising:
a first fiber comprising a first end, a second end, and a first effective nonlinearity determined at least by an index of refraction of the first fiber and an effective area of the first fiber;
a second fiber comprising a first end, a second end, and a second effective nonlinearity determined at least by an index of refraction of the second fiber and an effective area of the second fiber, wherein the first effective nonlinearity is distinct from the second effective nonlinearity, and at least a portion of one or both of the first fiber and the second fiber form a fiber loop; and
a coupler coupled to the first end of the first fiber, the first end of the second fiber, the wavelength demultiplexer, and the wavelength multiplexer; and
a first bi-directional amplifier coupled to the second end of the first fiber and the second end of the second fiber, and amplifying at least signals traveling in a first direction from the second end of the first fiber to the second end of the second fiber and signals traveling in a second direction from the second end of the second fiber to the second end of the first fiber.

55. The optical regeneration system of claim 54, wherein at least a portion of at least one of the first fiber or the second fiber comprises an absolute magnitude of dispersion of at least 20 ps/nm-km for at least a portion of wavelengths in the signal.

56. The optical regeneration system of claim 54, wherein at least a portion of at least one of the first fiber or the second fiber comprises an absolute magnitude of dispersion of at least 50 ps/nm-km for at least a portion of wavelengths in the signal.

57. The optical regeneration system of claim 54, wherein at least one of the first fiber or the second fiber comprises a nonlinear coefficient greater than 2 $W^{-1}$ $km^{-1}$.

58. The optical regeneration system of claim 54, wherein at least one of the first fiber or the second fiber comprises a nonlinear coefficient greater than 3 $W^{-1}$ $km^{-1}$.

59. The optical regeneration system of claim 54, wherein the coupler splits a power of the optical signals with a first portion of the optical signals traveling in a first direction in the fiber loop and a second portion of optical signals traveling in a counter-propagating direction in the fiber loop.

60. The optical regeneration system of claim 59, wherein the coupler provides substantially equal coupling in the two directions.

61. The optical regeneration system of claim 59, further comprising:
a polarization controller coupled to the fiber loop that aligns polarizations of the optical signals of the two directions when the optical signals recombine in the fiber loop.

62. The mirror of claim 52, further comprising:
a lossy element coupled to the fiber loop.

63. The mirror of claim 62, wherein the lossy member is selected from the group consisting of an add/drop multiplexer, a gain equalizer and a dispersion compensating element.

64. The mirror of claim 52, wherein the fiber loop has a first end and a second end, wherein the bi-directional amplifier is positioned closer to one of the first and second ends.

65. The mirror of claim 52, wherein the bi-directional amplifier is a rare earth doped amplifier.

66. The mirror of claim 52, wherein the bi-directional amplifier is an erbium-doped fiber amplifier.

67. The mirror of claim 52, wherein the bi-directional amplifier is a Raman amplifier.

68. The mirror of claim 52, wherein the fiber loop includes at least eight walk-off lengths.

69. The mirror of claim 52, wherein the mirror provides simultaneous amplification and dispersion compensation of an optical signal.

70. The mirror of claim 52, wherein the mirror provides simultaneous amplification, dispersion compensation and boosting of signal to noise ratio of an optical signal.

71. The mirror of claim 52, wherein the mirror provides a bi-directional amplifier gain of at least 10 dB.

72. An optical system for processing optical signals, comprising:
an input optical fiber;
a splitter coupled to the input optical fiber and separates adjacent channels of an input optical signal; and
at least a first loop mirror coupled to the splitter, the at least first loop mirror including a fiber loop, at least a portion of the fiber loop including a dispersion compensating fiber, at least a portion of the dispersion compensating fiber having an absolute magnitude of dispersion of 20 ps/nm-km for a majority of wavelengths in the optical signals.

73. The system of claim 72, further comprising:
a combiner coupled to the at least first loop mirror; and
at least one output fiber coupled to the combiner.

74. The system of claim 72, further comprising:
a coupler that splits a power of the optical signals with a first portion of the optical signals traveling in a first direction in the fiber loop and a second portion of optical signals traveling in a counter-propagating direction in the fiber loop.

75. The system of claim 72, wherein at least a portion of the dispersion compensating fiber has an absolute magnitude of dispersion of at least 50 ps/nm-km for at least a portion of wavelengths in the optical signals.

76. The system of claim 72, wherein the dispersion compensating fiber has a nonlinear coefficient greater than 2 $W^{-1}$ $km^{-1}$.

77. The system of claim 72, wherein the dispersion compensating fiber has a nonlinear coefficient greater than 3 $W^{-1}$ $km^{-1}$.

78. The system of claim 74, wherein the coupler provides substantially equal coupling in the two directions.

79. The system of claim 74, further comprising:
a polarization controller coupled to the fiber loop that aligns polarizations of the optical signals of the two directions when the optical signals recombine in the fiber loop.

80. The system of claim 72, further comprising: a lossy element coupled to the fiber loop.

81. The system of claim 80, wherein the lossy member is selected from the group consisting of an add/drop multiplexer, a gain equalizer and a dispersion compensating element.

82. The system of claim 72, further comprising:
a bi-directional amplifier positioned closer to one of a first end and a second end of the fiber loop.

83. The system of claim 82, wherein the bi-directional amplifier is a rare earth doped amplifier.

84. The system of claim 82, wherein the bi-directional amplifier is an erbium-doped fiber amplifier.

85. The system of claim 82, wherein the bi-directional amplifier is a Raman amplifier.

86. The system of claim 72, wherein the dispersion compensating fiber has a sufficiently large dispersion to minimize phase shift interactions between adjacent wavelength signals of the optical signals.

87. The system of claim 86, wherein the phase shift from cross phase modulation between adjacent wavelengths in the optical signals is no more than ¼ of a phase shift from self phase modulation of one of the adjacent wavelengths.

88. The system of claim 72, wherein the fiber loop includes at least eight walk-off lengths.

89. The system of claim 72, wherein the mirror provides simultaneous amplification and dispersion compensation of an optical signal.

90. The system of claim 72, wherein the mirror provides simultaneous amplification, dispersion compensation and boosting of signal to noise ratio of an optical signal.

91. The system of claim 82, wherein the bi-directional amplifier provides a gain to the optical signals of at least 10 dB.

92. A non-linear optical loop mirror, comprising:
a first optical fiber with a first effective non-linearity;
a second optical fiber coupled to the first optical fiber and forming a fiber loop, the second optical fiber having a second effective non-linearity that is different from the first effective non-linearity;
a coupler coupled to the first and second optical fibers, and
wherein a length of the first optical fiber is greater than a walk-off length for at least a portion of adjacent wavelengths propagating in the first fiber.

93. The mirror of claim 92, wherein a length of the second fiber is greater than a walk-off length for at least a portion of adjacent wavelengths propagating in the second fiber.

94. The mirror of claim 92, wherein the first effective non-linearity is directly proportional to a non-linear index of refraction of the first optical fiber and inversely proportion to an effective area of the first optical fiber, and the second effective non-linearity is directly proportional to a non-linear index of refraction of the second optical fiber and inversely proportion to an effective area of the second optical fiber.

95. The mirror of claim 92, wherein a difference between the first and second effective non-linearities is greater than 20% of at least one of the first and second effective non-linearities.

96. The mirror of claim 92, wherein the first and second optical fibers have different dispersions.

97. The mirror of claim 92, wherein the coupler splits a power of an optical signal with a first portion traveling in a first direction in the fiber loop and a second portion traveling in a counter-propagating direction in the fiber loop.

98. The mirror of claim 92, wherein at least a portion of one of the first and second optical fibers is a dispersion compensating fiber that has an absolute magnitude of dispersion of at least 20 ps/nm-km for at least a portion of wavelengths in the signal.

99. The mirror of claim 92, wherein at least a portion of one of the first and second optical fibers is a dispersion compensating fiber that has an absolute magnitude of dispersion of at least 50 ps/nm-km for at least a portion of wavelengths in the signal.

100. The mirror of claim 98, wherein the dispersion compensating fiber has a nonlinear coefficient greater than 2 $W^{-1}$ $km^{-1}$.

101. The mirror of claim 98, wherein the dispersion compensating fiber has a nonlinear coefficient greater than 3 $W^{-1}$ $km^{-1}$.

102. The mirror of claim 97, wherein the coupler provides substantially equal coupling in the two directions.

103. The mirror of claim 97, further comprising:
a polarization controller coupled to the fiber loop that aligns polarizations of the optical signals of the two directions when the optical signals recombine in the fiber loop.

104. The mirror of claim 92, further comprising:
a lossy element coupled to the fiber loop.

105. The mirror of claim 104, wherein the lossy member is selected from the group consisting of an add/drop multiplexer, a gain equalizer and a dispersion compensating element.

106. The mirror of claim 92, wherein at least one of the first and second optical fibers has a sufficiently large dispersion to minimize phase shift interactions between adjacent wavelength signals of the optical signals.

107. The mirror of claim 106, wherein the phase shift from cross phase modulation between adjacent wavelengths in the optical signals is no more than ¼ of a phase shift from self phase modulation of one of the adjacent wavelengths.

108. The mirror of claim 92, wherein the mirror provides simultaneous dispersion compensation and boosting of signal to noise ratio of an optical signal.

109. The mirror of claim 92, wherein at least one of the first and second optical fibers has a length of at least 100 m.

110. A non-linear optical loop mirror, comprising:
a first optical fiber with a first effective non-linearity;
a second optical fiber coupled to the first optical fiber and forming a fiber loop, the second optical fiber having a second effective non-linearity that is different from the first effective non-linearity;
a bi-directional amplifier coupled to at least one of the first and second optical fibers and positioned substantially at a midpoint of the fiber loop; and
a coupler coupled to the first and second optical fibers.

111. The mirror of claim 110, wherein a length of the first optical fiber is greater than a walk-off length for at least a portion of adjacent wavelengths propagating in the first fiber.

112. The mirror of claim 110, wherein a length of the second fiber is greater than a walk-off length for at least a portion of adjacent wavelengths propagating in the second fiber.

113. The mirror of claim 110, wherein the first effective non-linearity is directly proportional to a non-linear index of refraction of the first optical fiber and inversely proportion to an effective area of the first optical fiber, and the second effective non-linearity is directly proportional to a non-linear index of refraction of the second optical fiber and inversely proportion to an effective area of the second optical fiber.

114. The mirror of claim 110, wherein a difference between the first and second effective non-linearities is greater than 20% of at least one of the first and second effective non-linearities.

115. The mirror of claim 110, wherein the first and second optical fibers have different dispersions.

116. The mirror of claim 110, wherein the coupler splits a power of an optical signal with a first portion traveling in a first direction in the fiber loop and a second portion traveling in a counter-propagating direction in the fiber loop.

117. The mirror of claim 110, wherein at least a portion of one of the first and second optical fibers is a dispersion compensating fiber that has an absolute magnitude of dispersion of at least 20 ps/nm-km for at least a portion of wavelengths in the signal.

118. The mirror of claim 110, wherein at least a portion of one of the first and second optical fibers is a dispersion compensating fiber that has an absolute magnitude of dispersion of at least 50 ps/nm-km for at least a portion of wavelengths in the signal.

119. The mirror of claim 117, wherein the dispersion compensating fiber has a nonlinear coefficient greater than 2 $W^{-1}$ $km^{-1}$.

120. The mirror of claim 117, wherein the dispersion compensating fiber has a nonlinear coefficient greater than 3 $W^{-1}$ $km^{-1}$.

121. The mirror of claim 116, wherein the coupler provides substantially equal coupling in the two directions.

122. The mirror of claim 116, further comprising:
a polarization controller coupled to the fiber loop that aligns polarizations of the optical signals of the two directions when the optical signals recombine in the fiber loop.

123. The mirror of claim 110, further comprising:
a lossy element coupled to the fiber loop.

124. The mirror of claim 123, wherein the lossy member is selected from the group consisting of an add/drop multiplexer, a gain equalizer and a dispersion compensating element.

125. The mirror of claim 110, wherein the bi-directional amplifier is coupled to each of the first and second optical fibers.

126. The mirror of claim 110, wherein the bi-directional amplifier is a rare earth doped amplifier.

127. The mirror of claim 110, wherein the bi-directional amplifier is an erbium-doped fiber amplifier.

128. The mirror of claim 110, wherein the bi-directional amplifier is a Raman amplifier.

129. The mirror of claim 110, wherein at least one of the first and second optical fibers has a sufficiently large dispersion to minimize phase shift interactions between adjacent wavelength signals of the optical signals.

130. The mirror of claim 129, wherein the phase shift from cross phase modulation between adjacent wavelengths in the optical signals is no more than ¼ of a phase shift from self phase modulation of one of the adjacent wavelengths.

131. The mirror of claim 110, wherein the mirror provides simultaneous amplification and dispersion compensation of an optical signal.

132. The mirror of claim 110, wherein the mirror provides simultaneous amplification, dispersion compensation and boosting of signal to noise ratio of an optical signal.

133. The mirror of claim 110, wherein the bi-directional amplifier provides a gain to the optical signals of at least 10 dB.

134. The mirror of claim 110 wherein at least one of the first and second optical fibers has a length of at least 100 m.

135. An optical system for processing optical signals, comprising:
an input optical fiber;
a splitter coupled to the input optical fiber and separates adjacent channels of an input optical signal; and
at least a first loop mirror coupled to the splitter, the at least first loop mirror including:
an optical fiber with a signal input and a signal output, at least a portion of the optical fiber being a dispersion compensating fiber and at least a portion of the optical fiber forming a loop, the dispersion compensating fiber having an absolute magnitude of dispersion of at least 20 ps/nm-km for at least a portion of wavelengths in the optical signals;
a bi-directional amplifier coupled to the optical fiber; and
a coupler coupled to a first portion of the optical fiber and a second portion of the optical fiber to form a fiber loop.

136. The optical system of claim 135, wherein the coupler splits a power of the optical signals with a first portion of the optical signals traveling in a first direction in the fiber loop and a second portion of optical signals traveling in a counter-propagating direction in the fiber loop.

137. The optical system of claim 135, wherein at least a portion of the dispersion compensating fiber has an absolute magnitude of dispersion of at least 20 ps/nm-km for a majority of wavelengths in the optical signals.

138. The optical system of claim 135, wherein at least a portion of the dispersion compensating fiber has an absolute magnitude of dispersion of at least 50 ps/nm-km for at least a portion of wavelengths in the optical signals.

139. The optical system of claim 135, wherein the dispersion compensating fiber has a nonlinear coefficient greater than 2 $W^{-1}$ $km^{-1}$.

140. The optical system of claim 135, wherein the dispersion compensating fiber has a nonlinear coefficient greater than 3 $W^{-1}$ $km^{-1}$.

141. The optical system of claim 136, wherein the coupler provides substantially equal coupling in the two directions.

142. The optical system of claim 136, further comprising:
a polarization controller coupled to the fiber loop that aligns polarizations of the optical signals of the two directions when the optical signals recombine in the fiber loop.

143. The optical system of claim 135, further comprising: a lossy element coupled to the fiber loop.

144. The optical system of claim 143, wherein the lossy member is selected from the group consisting of an add/drop multiplexer, a gain equalizer and a dispersion compensating element.

145. The optical system of claim 135, wherein the fiber loop has a first end and a second end and the bi-directional amplifier is positioned closer to one of the first and second ends.

146. The optical system of claim 135, wherein the bi-directional amplifier is a rare earth doped amplifier.

147. The optical system of claim 135, wherein the bi-directional amplifier is an erbium-doped fiber amplifier.

148. The optical system of claim 135, wherein the bi-directional amplifier is a Raman amplifier.

149. The optical system of claim 135, wherein the dispersion compensating fiber has a sufficiently large dispersion to minimize phase shift interactions between adjacent wavelength signals of the optical signals.

150. The optical system of claim 149, wherein the phase shift from cross phase modulation between adjacent wavelengths in the optical signals is no more than ¼ of a phase shift from self phase modulation of one of the adjacent wavelengths.

151. The optical system of claim 135, wherein the fiber loop includes at least eight walk-off lengths.

152. The optical system of claim 135, wherein the mirror provides simultaneous amplification and dispersion compensation of an optical signal.

153. The optical system of claim 135, wherein the mirror provides simultaneous amplification, dispersion compensation and boosting of signal to noise ratio of an optical signal.

154. The optical system of claim 135, wherein the bi-directional amplifier provides a gain to at least some of the optical signals of at least 10 dB.

155. The optical system of claim 135, further comprising: a combiner coupled to the at least first loop mirror; and at least one output fiber coupled to the combiner.

156. An optical system for processing optical signals, comprising:
an input optical fiber;
a splitter coupled to the input optical fiber and separates adjacent channels of an input optical signal; and
at least a first loop mirror coupled to the splitter, the at least first loop mirror including:
a first optical fiber with a signal input and a signal output, a second optical fiber coupled to the first optical fiber to form a fiber loop, at least a portion of the second optical fiber being a dispersion compensating fiber that has an absolute magnitude of dispersion of at least 20 ps/nm-km for at least a portion of wavelengths in the optical signals;
a bi-directional amplifier coupled to at least one of the first and second optical fibers; and
a coupler coupled to the first and second optical fiber.

157. The optical system of claim 156, wherein the coupler splits a power of an optical signal with a first portion traveling in a first direction in the fiber loop and a second portion traveling in a counter-propagating direction in the fiber loop.

158. The optical system of claim 156, wherein at least a portion of the dispersion compensating fiber has an absolute magnitude of dispersion of at least 20 ps/nm-km for a majority of wavelengths in the signal.

159. The optical system of claim 156, wherein at least a portion of the dispersion compensating fiber has an absolute magnitude of dispersion of at least 50 ps/nm-km for at least a portion of wavelengths in the signal.

160. The optical system of claim 156, wherein the dispersion compensating fiber has a nonlinear coefficient greater than 2 $W^{-1}$ $km^{-1}$.

161. The optical system of claim 156, wherein the dispersion compensating fiber has a nonlinear coefficient greater than 3 $W^{-1}$ $km^{-1}$.

162. The optical system of claim 157, wherein the coupler provides substantially equal coupling in the two directions.

163. The optical system of claim 157, further comprising:
a polarization controller coupled to the fiber loop that aligns polarizations of the optical signals of the two directions when the optical signals recombine in the fiber loop.

164. The optical system of claim 156, further comprising:
a lossy element coupled to the fiber loop.

165. The optical system of claim 164, wherein the lossy member is selected from the group consisting of an add/drop multiplexer, a gain equalizer and a dispersion compensating element.

166. The optical system of claim 156, wherein the fiber loop has a first end and a second end, wherein the bi-directional amplifier is positioned closer to one of the first and second ends.

167. The optical system of claim 156, wherein the bi-directional amplifier is a rare earth doped amplifier.

168. The optical system of claim 156, wherein the bi-directional amplifier is an erbium-doped fiber amplifier.

169. The optical system of claim 156, wherein the bi-directional amplifier is a Raman amplifier.

170. The optical system of claim 156, wherein the dispersion compensating fiber has a sufficiently large dispersion to minimize phase shift interactions between adjacent wavelength signals of the optical signals.

171. The optical system of claim 170, wherein the phase shift from cross phase modulation between adjacent wavelengths in the optical signals is no more than ¼ of a phase shift from self phase modulation of one of the adjacent wavelengths.

172. The optical system of claim 156, wherein the fiber loop includes at least eight walk-off lengths.

173. The optical system of claim 156, wherein the mirror provides simultaneous amplification and dispersion compensation of an optical signal.

174. The optical system of claim 156, wherein the mirror provides simultaneous amplification, dispersion compensation and boosting of signal to noise ratio of an optical signal.

175. The optical system of claim 156, wherein the bi-directional amplifier provides a gain to the optical signals of at least 10 dB.

176. The optical system of claim 156, further comprising:
a combiner coupled to the at least first loop mirror; and
at least one output fiber coupled to the combiner.

177. An optical system for processing optical signals, comprising:
an input optical fiber;
a splitter coupled to the input optical fiber and separates adjacent channels of an input optical signal; and
at least a first loop mirror coupled to the splitter, the at least first loop mirror including:
a first optical fiber with a first effective non-linearity;
a second optical fiber coupled to the first optical fiber and forming a fiber loop, the second optical fiber having a second effective non-linearity that is different from the first effective non-linearity;

a coupler coupled to the first and second optical fibers, and wherein a length of the first optical fiber is greater than a walk-off length for at least a portion of adjacent wavelengths propagating in the first fiber.

178. The optical system of claim 177, wherein a length of the second fiber is greater than a walk-off length for at least a portion of adjacent wavelengths propagating in the second fiber.

179. The optical system of claim 177, wherein the first effective non-linearity is directly proportional to a non-linear index of refraction of the first optical fiber and inversely proportion to an effective area of the first optical fiber, and the second effective non-linearity is directly proportional to a non-linear index of refraction of the second optical fiber and inversely proportion to an effective area of the second optical fiber.

180. The optical system of claim 177, wherein a difference between the first and second effective non-linearities is greater than 20% of at least one of the first and second effective non-linearities.

181. The optical system of claim 177, wherein the first and second optical fibers have different dispersions.

182. The optical system of claim 177, wherein the coupler splits a power of an optical signal with a first portion traveling in a first direction in the fiber loop and a second portion traveling in a counter-propagating direction in the fiber loop.

183. The optical system of claim 177, wherein at least a portion of one of the first and second optical fibers is a dispersion compensating fiber that has an absolute magnitude of dispersion of at least 20 ps/nm-km for at least a portion of wavelengths in the signal.

184. The optical system of claim 177, wherein at least a portion of one of the first and second optical fibers is a dispersion compensating fiber that has an absolute magnitude of dispersion of at least 50 ps/nm-km for at least a portion of wavelengths in the signal.

185. The optical system of claim 183, wherein the dispersion compensating fiber has a nonlinear coefficient greater than 2 $W^{-1}$ $km^{-1}$.

186. The optical system of claim 183, wherein the dispersion compensating fiber has a nonlinear coefficient greater than 3 $W^{-1}$ $km^{-1}$.

187. The optical system of claim 182, wherein the coupler provides substantially equal coupling in the two directions.

188. The optical system of claim 182, further comprising:
a polarization controller coupled to the fiber loop that aligns polarizations of the optical signals of the two directions when the optical signals recombine in the fiber loop.

189. The optical system of claim 177, further comprising:
a lossy element coupled to the fiber loop.

190. The optical system of claim 189, wherein the lossy member is selected from the group consisting of an add/drop multiplexer, a gain equalizer and a dispersion compensating element.

191. The optical system of claim 177, wherein at least one of the first and second optical fibers has a sufficiently large dispersion to minimize phase shift interactions between adjacent wavelength signals of the optical signals.

192. The optical system of claim 191, wherein the phase shift from cross phase modulation between adjacent wavelengths in the optical signals is no more than 14 of a phase shift from self phase modulation of one of the adjacent wavelengths.

193. The optical system of claim 177, wherein the mirror provides simultaneous dispersion compensation and boosting of signal to noise ratio of an optical signal.

194. The optical system of claim 177, wherein at least one of the first and second optical fibers has a length of at least 100 m.

195. The optical system of claim 177, further comprising:
a combiner coupled to the at least first loop mirror; and
at least one output fiber coupled to the combiner.

196. An optical system for processing optical signals, comprising:
an input optical fiber;
a splitter coupled to the input optical fiber and separates adjacent channels of an input optical signal; and
at least a first loop mirror coupled to the splitter, the at least first loop mirror including:
a first optical fiber with a first effective non-linearity;
a second optical fiber coupled to the first optical fiber and forming a fiber loop, the second optical fiber having a second effective non-linearity that is different from the first effective non-linearity;
a bi-directional amplifier coupled to at least one of the first and second optical fibers and positioned substantially at a midpoint of the fiber loop; and
a coupler coupled to the first and second optical fibers.

197. The optical system of claim 196, wherein a length of the first optical fiber is greater than a walk-off length for at least a portion of adjacent wavelengths propagating in the first fiber.

198. The optical system of claim 196, wherein a length of the second fiber is greater than a walk-off length for at least a portion of adjacent wavelengths propagating in the second fiber.

199. The optical system of claim 196, wherein the first effective non-linearity is directly proportional to a non-linear index of refraction of the first optical fiber and inversely proportion to an effective area of the first optical fiber, and the second effective non-linearity is directly proportional to a non-linear index of refraction of the second optical fiber and inversely proportion to an effective area of the second optical fiber.

200. The optical system of claim 196, wherein a difference between the first and second effective non-linearities is greater than 20% of at least one of the first and second effective non-linearities.

201. The optical system of claim 196, wherein the first and second optical fibers have different dispersions.

202. The optical system of claim 196, wherein the coupler splits a power of an optical signal with a first portion traveling in a first direction in the fiber loop and a second portion traveling in a counter-propagating direction in the fiber loop.

203. The optical system of claim 196, wherein at least a portion of one of the first and second optical fibers is a dispersion compensating fiber that has an absolute magnitude of dispersion of at least 20 ps/nm-km for at least a portion of wavelengths in the signal.

204. The optical system of claim 196, wherein at least a portion of one of the first and second optical fibers is a dispersion compensating fiber that has an absolute magnitude of dispersion of at least 50 ps/nm-km for at least a portion of wavelengths in the signal.

205. The optical system of claim 203, wherein the dispersion compensating fiber has a nonlinear coefficient greater than 2 $W^{-1}$ $km^{-1}$.

206. The optical system of claim 203, wherein the dispersion compensating fiber has a nonlinear coefficient greater than 3 $W^{-1}$ $km^{-1}$.

207. The optical system of claim 202, wherein the coupler provides substantially equal coupling in the two directions.

208. The optical system of claim 202, further comprising:

a polarization controller coupled to the fiber loop that aligns polarizations of the optical signals of the two directions when the optical signals recombine in the fiber loop.

209. The optical system of claim 196, further comprising:

a lossy element coupled to the fiber loop.

210. The optical system of claim 209, wherein the lossy member is selected from the group consisting of an add/drop multiplexer, a gain equalizer and a dispersion compensating element.

211. The optical system of claim 196, wherein the bi-directional amplifier is coupled to each of the first and second optical fibers.

212. The optical system of claim 196, wherein the bi-directional amplifier is a rare earth doped amplifier.

213. The optical system of claim 196, wherein the bi-directional amplifier is an erbium-doped fiber amplifier.

214. The optical system of claim 196, wherein the bi-directional amplifier is a Raman amplifier.

215. The optical system of claim 196, wherein at least one of the first and second optical fibers has a sufficiently large dispersion to minimize phase shift interactions between adjacent wavelength signals of the optical signals.

216. The optical system of claim 215, wherein the phase shift from cross phase modulation between adjacent wavelengths in the optical signals is no more than % of a phase shift from self phase modulation of one of the adjacent wavelengths.

217. The optical system of claim 196, wherein the mirror provides simultaneous amplification and dispersion compensation of an optical signal.

218. The optical system of claim 196, wherein the mirror provides simultaneous amplification, dispersion compensation and boosting of signal to noise ratio of an optical signal.

219. The optical system of claim 196, wherein the bi-directional amplifier provides a gain to the optical signals of at least 10 dB.

220. The optical system of claim 196, wherein at least one of the first and second optical fibers has a length of at least 100 m.

221. The optical system of claim 196, further comprising:

a combiner coupled to the at least first loop mirror; and at least one output fiber coupled to the combiner.

* * * * *